(12) United States Patent
Bandoh

(10) Patent No.: US 8,191,792 B2
(45) Date of Patent: Jun. 5, 2012

(54) TEMPERATURE SENSOR, TEMPERATURE CONTROL DEVICE, TEMPERATURE CONTROLLER AND TEMPERATURE-CONTROL METHOD

(75) Inventor: Kenichi Bandoh, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 466 days.

(21) Appl. No.: 11/825,065

(22) Filed: Jul. 3, 2007

(65) Prior Publication Data

US 2008/0043803 A1 Feb. 21, 2008

(30) Foreign Application Priority Data

Jul. 6, 2006 (JP) ................................. 2006-187246
Jul. 6, 2006 (JP) ................................. 2006-187247
Jun. 29, 2007 (JP) ................................. 2007-172964

(51) Int. Cl.
*F24F 11/053* (2006.01)
*G05D 23/12* (2006.01)
*G05D 23/185* (2006.01)
*G01N 25/72* (2006.01)
*G01K 1/00* (2006.01)
*G01K 7/00* (2006.01)

(52) U.S. Cl. ............ 236/1 C; 374/5; 374/100; 374/163; 374/185; 374/208

(58) Field of Classification Search .............. 374/5, 100, 374/141, 163, 185, 208; 236/1 C
See application file for complete search history.

(56) References Cited

U.S. PATENT DOCUMENTS

| 2,817,235 A | * | 12/1957 | Hunter et al. | ................ | 374/136 |
| 4,396,899 A | * | 8/1983 | Ohno | .............................. | 338/34 |
| 5,476,137 A | * | 12/1995 | Ochiai et al. | ................... | 165/206 |
| 6,257,758 B1 | * | 7/2001 | Culbertson | .................... | 374/120 |

(Continued)

FOREIGN PATENT DOCUMENTS

| JP | 62-047124 U |   | 3/1987 |
| JP | 63113325 A | * | 5/1988 |
| JP | 64-35228 A |   | 2/1989 |
| JP | 04-051538 A |   | 2/1992 |
| JP | 04-148545 A |   | 5/1992 |
| JP | 6-022861 A |   | 2/1994 |

(Continued)

OTHER PUBLICATIONS

Japanese Office Action dated Mar. 27, 2012 (and English translation thereof) in counterpart Japanese Application No. 2007-172964.

*Primary Examiner* — Frantz Jules
*Assistant Examiner* — Daniel C Comings
(74) *Attorney, Agent, or Firm* — Holtz, Holtz, Goodman & Chick, PC

(57) ABSTRACT

A temperature sensor (10) includes: a temperature-sensing portion for measuring a temperature of an object (50) by contacting the object; and a supporting portion for supporting the temperature-sensing portion from a side opposite to a contact surface, the supporting portion having a space at a portion partially corresponding to the temperature-sensing portion. A temperature controller includes: a temperature control device; the temperature sensor (10) for measuring the temperature by contacting the object (50); and a controller for controlling the temperature control device. The controller includes: a mounting-state judging means for judging a mounting-state of the object (50); a switching means for switching a control gain and a target temperature of the temperature control device based on the judging result; and a control-command generating means for generating a control command based on the control gain, the target temperature and a measurement value of the temperature sensor (10).

15 Claims, 16 Drawing Sheets

U.S. PATENT DOCUMENTS

| | | | |
|---|---|---|---|
| 6,572,265 B1* | 6/2003 | Gotthold et al. | 374/161 |
| 2003/0206574 A1* | 11/2003 | Yun | 374/135 |
| 2004/0004990 A1* | 1/2004 | Khan | 374/161 |
| 2006/0289458 A1* | 12/2006 | Kim et al. | 219/497 |
| 2007/0086503 A1 | 4/2007 | Fujii | |
| 2008/0080586 A1* | 4/2008 | Huetter et al. | 374/31 |

FOREIGN PATENT DOCUMENTS

| | | |
|---|---|---|
| JP | 6-302378 A | 10/1994 |
| JP | 07-221154 A | 8/1995 |
| JP | 2001-230199 A | 8/2001 |
| JP | 2003-100605 A | 4/2003 |
| WO | 2006/003798 A1 | 1/2006 |

\* cited by examiner

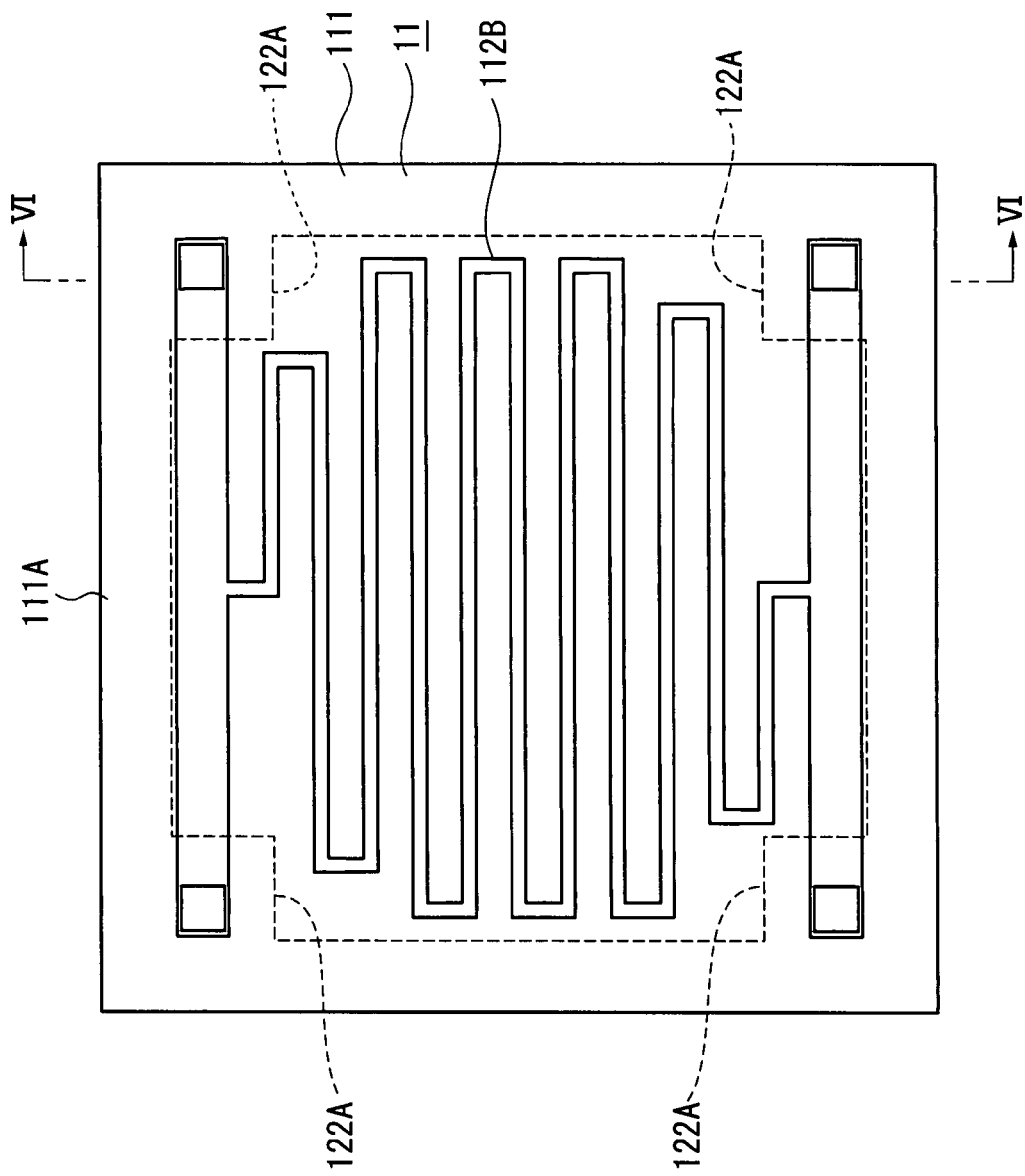

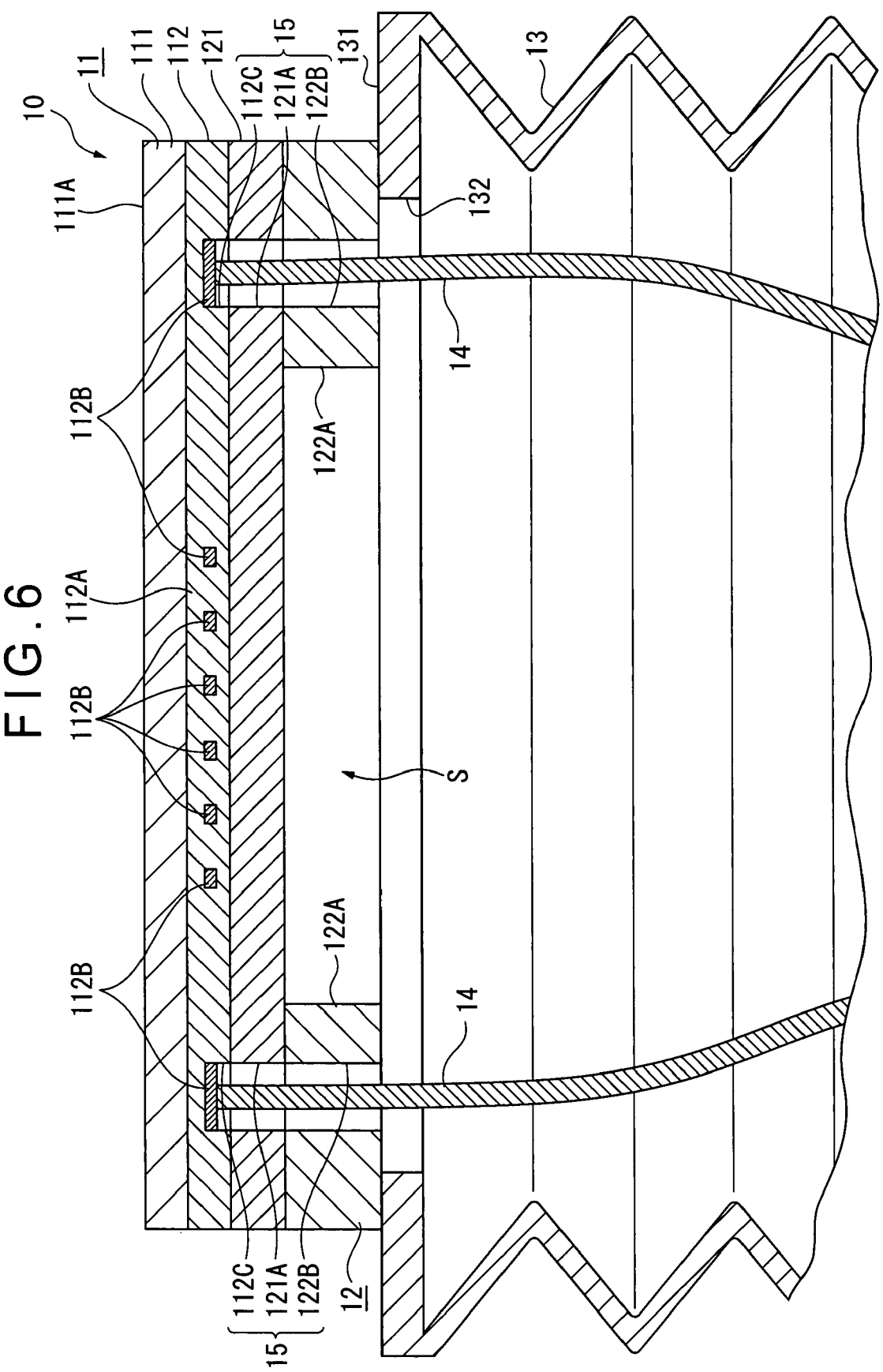

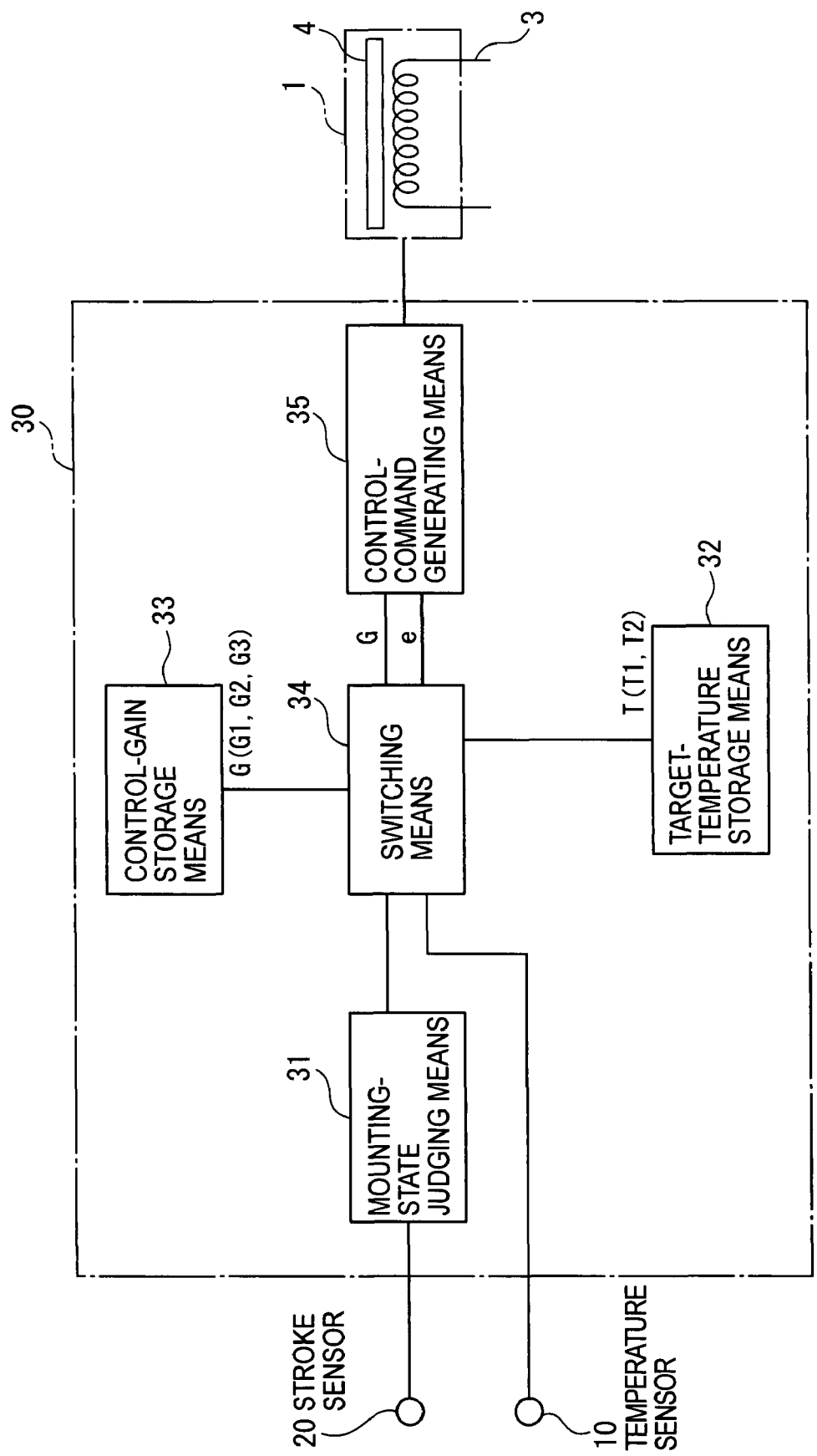

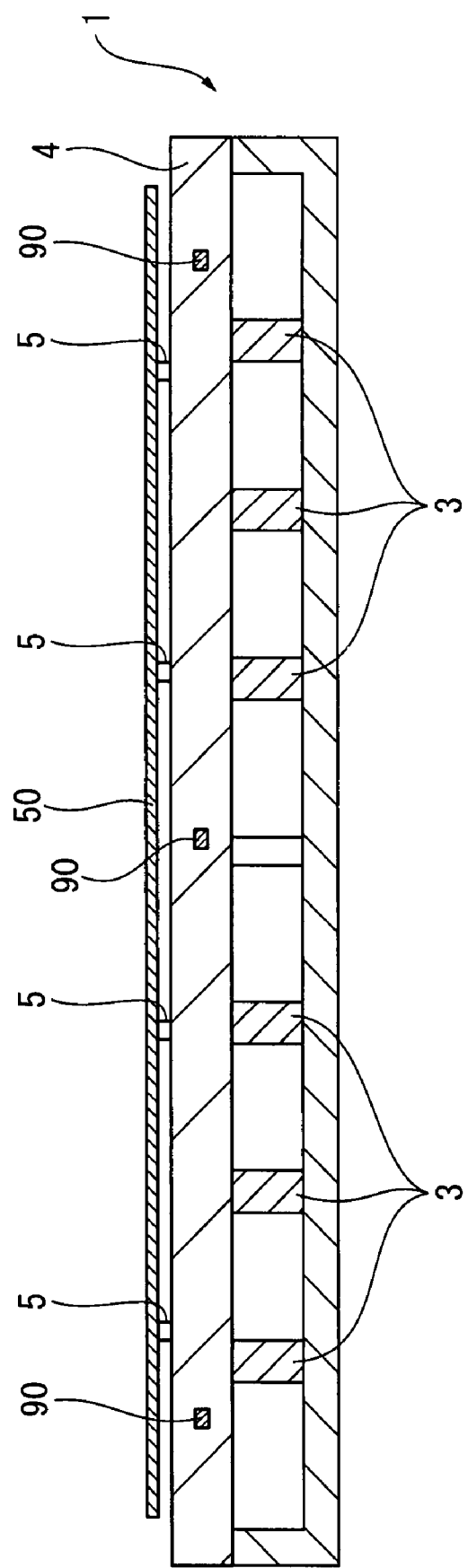

TEMPERATURE SENSOR, TEMPERATURE CONTROL DEVICE, TEMPERATURE CONTROLLER AND TEMPERATURE-CONTROL METHOD

BACKGROUND OF THE INVENTION

1. Field of the Invention

The present invention relates to a temperature sensor, a temperature control device and a temperature controller that include the temperature sensor, and a method of temperature control, particularly to a temperature sensor, a temperature control device, a temperature controller and a method of temperature control for a semiconductor wafer.

2. Description of Related Art

In recent years, along with demands for a performance enhancement and a cost reduction of semiconductor devices, there have been demands for a miniaturization, an improvement of yield, an improvement of throughput and a high-mix low-volume manufacturing in manufacturing processes of semiconductor devices. In order to meat these demands, a high accuracy is required in a circuit linewidth. The accuracy of the circuit linewidth depends on a wafer temperature inside a chamber in a heat treatment process. Accordingly, in the manufacturing processes of the semiconductor devices, it has been important to maintain the wafer temperature in the heat treatment process at a predetermined value. For example, in photolithography, the wafer temperature is controlled by adjusting a temperature of a hot plate for heating the wafer and a temperature of a cooling plate for cooling.

Particularly in photolithography, a chemically-amplified resist agent used for forming a linewidth of 150 nm or below is vulnerable to an influence of temperature changes. The linewidth formed using the resist agent largely depends on a heating temperature in a post exposure bake (PEB) treatment after exposure. When the chemically-amplified resist agent is used, a uniformity of in-plane temperature distribution of the wafer is required to be within ±0.1° C. in a steady state of the PEB treatment, whereby a distinctly high accuracy is required. In order to meet such demands, a temperature sensor is also required to secure a measurement accuracy of the same level.

For example, as shown in FIG. 16, in photolithography, a wafer 50 is mounted on a hot plate 1, such that a heater 3 provided in the hot plate 1 heats the wafer 50. At that time, in order to prevent a back surface of the wafer 50 from being contaminated by contacting a plate body 4 forming the hot plate 1, the wafer 50 is mounted on the hot plate 1 via a support pin 5 provided on the plate body 4. In order to enhance a responsivity of the wafer 50 to a temperature adjustment of the hot plate 1, a height dimension of the support pin 5 from a surface of the plate body 4 is set at a distinctly small value of approximately 0.1 mm.

In this state, a uniformity of an in-plane temperature distribution of the wafer 50 mounted on the hot plate 1 is adjusted by a multivariable control of the heaters 3 using a measurement value of temperature sensors 90 embedded in a plurality of points of the plate body 4 (e.g., Document 2: JP-A-2001-230199). In this case, since an actual temperature of the wafer 50 to be controlled is unknown, there is a difficulty in accurately performing a temperature control of the wafer 50.

Accordingly, in order to obtain the actual temperature of the wafer 50, there has been developed a temperature sensor that directly measures the temperature of the wafer 50 by contacting the wafer 50 inside the chamber (e.g.: Document 1: JP-A-2003-100605; Document 3: JP-A-07-221154; Document 4: JP-A-04-148545; Document 5: JP-A-04-51538; and Document 6: JP-UM-A-62-47124).

In addition, there has been a demand for a temperature controller for controlling a temperature of a wafer based on a measurement value of a temperature sensor, which is obtained by measuring an actual temperature of the wafer by bringing the temperature sensor into contact with the wafer.

However, the temperature sensor according to Document 1 is directly attached to a spherical spacer on a heating plate, and heat of the heating plate is conducted to the temperature sensor via the spacer. Thus, the temperature sensor is influenced by the heat of the heating plate in measuring the temperature, whereby a measurement accuracy of the wafer temperature is not sufficiently secured.

In the temperature sensor according to Document 3, a support pin made of silica glass supports a thermocouple, and an alumina cap bonded with the thermocouple is provided at a tip end of the support pin. However, since silica glass forming the support pin has a high heat conductivity of approximately 1.4 W/mk and a diameter of the support pin is as large as 2.5 to 3.5 mm, a large amount of heat is conducted to the support pin from the wafer. Accordingly, the measurement accuracy of the wafer temperature is not sufficiently secured. In actuality, Document 3 recites that a measurement error of the temperature sensor is approximately several degrees (° C.).

In addition, since the diameter of the cap surface contacting the wafer is as large as 4 mm, a large amount of heat is discharged from the wafer via the cap, whereby the uniformity of the in-plane temperature of the wafer may be influenced.

In the temperature sensor according to Document 4, since an outer diameter of a rod-like cover member that covers the thermocouple is as large as approximately 0.5 to 0.8 mm, when a space between the wafer in a mounting state and the plate is set at approximately 0.1 mm, the temperature sensor cannot be disposed within the space. Even if the temperature sensor is disposed, since a tip end of the cover member that contacts the wafer is a flat surface of approximately 0.5 mm width and a contact area with the wafer is large, a large amount of heat is discharged from the wafer, whereby a uniformity of an in-plane temperature of the wafer may be influenced.

In the temperature sensor according to Document 5, since a support pin for supporting a metal thin film is much larger than the metal thin film, a large amount of heat is discharged to the support pin. Accordingly, the measurement accuracy of the wafer temperature is not sufficiently secured.

In addition, since the large amount of heat is discharged to the support pin, a uniformity of an in-plane temperature of the wafer may be influenced.

In the temperature sensor according to Document 6, a spring fixed to a heater is mounted with a circular disc that contacts the wafer, and the circular disc is mounted with a thermocouple. With this arrangement, the heat of the heater is conducted to the thermocouple via the spring and the circular disk, such that the thermocouple may be influenced by the heat of the heater in measuring the temperature. Accordingly, the measurement accuracy of the wafer temperature is not sufficiently secured.

In addition, since an area of the circular disc with which the disc contacts the wafer is large, a large amount of heat is discharged from the wafer to the spring and the circular disc, whereby a uniformity of an in-plane temperature of the wafer may be influenced.

When the wafer temperature is measured by bringing the temperature sensor into contact with the wafer, the temperature sensor directly contacts a gas inside the chamber, unlike an arrangement of Document 2 in which the temperature sensor is embedded in the plate body. Accordingly, the measurement value of the temperature sensor is greatly fluctuated due to an influence of a natural convection arising on the hot plate before the wafer is mounted, and a control command for the hot plate is also fluctuated in accordance therewith. In this case, the temperature of the hot place is also largely fluctuated in accordance with the control command, whereby a subsequent temperature control may not be smoothly performed.

SUMMARY OF THE INVENTION

An object of the present invention is to provide a temperature sensor that can secure a sufficient measurement accuracy without influencing a temperature distribution of an object to be measured and to provide a temperature control device that includes the temperature sensor.

In addition, another object of the present invention is to provide a temperature controller and a temperature controlling method with which an influence of a natural convection is avoided and a temperature of an object to be temperature-controlled can be controlled with a stable control command fluctuation and settling time.

A temperature sensor according to an aspect of the present invention is a temperature sensor that measures a temperature of a measured object, the temperature sensor including: a temperature-sensing portion having a plane contact surface, the temperature-sensing portion measuring the temperature of the object with the contact surface contacting the object; and a supporting portion that supports the temperature-sensing portion from a side opposite to the contact surface, the supporting portion having a space at a portion that partially corresponds to the temperature-sensing portion.

According to the aspect of the present invention, since the supporting portion for supporting the temperature-sensing portion from the side opposite to the contact surface of the object has the space at the portion partially corresponding to the temperature-sensing portion, the air inside the space provides an air layer to the supporting portion. With this arrangement, the heat conductivity of the supporting portion can be reduced, whereby the supporting portion can serve as a heat insulating layer whose heat conductivity is approximated to that of the air. Accordingly, the heat applied to the object can be prevented from being conducted to the supporting portion, thereby securing a sufficient measurement accuracy.

In the temperature sensor according to the aspect of the present invention, it is desirable that the supporting portion is made of a resin or glass.

According to the aspect of the present invention, since the supporting portion is made of a resin or glass whose heat conductivity is low, the heat conductivity of the supporting portion can be further reduced. Accordingly, the heat conductivity of the supporting portion can be approximated to that of the air, whereby the supporting portion can more effectively perform functions as the heat insulating layer. Thus, the temperature of the object can be measured with an enhanced accuracy.

In the temperature sensor according to the aspect of the present invention, it is desirable that the temperature sensor further includes a biasing member that biases the temperature-sensing portion to the object.

According to the aspect of the present invention, since the biasing member for biasing the temperature-sensing portion toward the object is provided, the temperature-sensing portion can be biased to the object against the self-weight of the object by the biasing force of the biasing member. Accordingly, even when a level of retroflexion varies from object to object, the temperature-sensing portion can follow the object, thereby reliably contacting the object.

In the temperature sensor according to the aspect of the present invention, it is desirable that the supporting portion is provided between the temperature-sensing portion and the biasing member.

According to the aspect of the present invention, since the supporting portion is provided between the temperature-sensing portion and the biasing member, the supporting portion serves as a heat insulating layer for insulating between the temperature-sensing portion and the biasing member. With this arrangement, the heat of the biasing member is prevented from being conducted to the temperature-sensing portion, thereby preventing the temperature measurement by the temperature-sensing portion from being influenced. Accordingly, the heat of the biasing member can be prevented from being conducted to the temperature-sensing portion, thereby further enhancing the measurement accuracy.

In the temperature sensor according to the aspect of the present invention, it is desirable that the biasing member is a bellows.

According to the aspect of the present invention, since the biasing member is the bellows, the biasing member can be simply configured. Accordingly, the temperature-sensing portion can be reliably brought in contact with the object with a simple configuration.

In the temperature sensor according to the aspect of the present invention, it is desirable that the temperature sensor further includes a conductor connected to the temperature-sensing portion, in which the conductor is connected to the temperature-sensing portion on the side opposite to the contact surface.

According to the aspect of the present invention, since the conductor is connected to the temperature-sensing portion at the side opposite to the contact surface, the conductor does not contact the wafer when the temperature-sensing portion contacts the wafer. Accordingly, an error in the measurement temperature can be prevented from being caused by a contact between the conductor and the wafer.

A temperature sensor according to another aspect of the present invention is a temperature sensor that measures a temperature of a measured object, the temperature sensor including: a temperature-sensing portion having a plane contact surface, the temperature-sensing portion measuring the temperature of the object with the contact surface contacting the object; a supporting portion that supports the temperature-sensing portion from a side opposite to the contact surface; a biasing member having an end portion provided at an end in a biasing direction and a hole provided in the end portion, the biasing member biasing the temperature-sensing portion to the object; and a conductor connected to the temperature-sensing portion, the conductor being drawn from the temperature-sensing portion to an outside, in which the supporting portion and the end portion of the biasing member define a space at a portion that partially corresponds to the temperature-sensing portion, and the conductor is drawn from the temperature-sensing portion to the outside through an inside of the supporting portion, the hole of the biasing member and an inside of the biasing member.

According to the aspect of the present invention, the space is defined at the portion partially corresponding to the temperature-sensing portion by: the supporting portion for supporting the temperature-sensing portion from the side opposite to the contact surface of the object; and the end portion of the biasing member for biasing the temperature-sensing portion. With this arrangement, the air inside the space provides an air layer to the supporting portion. Accordingly, the heat conductivity of the supporting portion can be reduced, whereby the supporting portion can serve as a heat insulating layer whose heat conductivity is approximated to that of the air. Hence, the heat applied to the object can be prevented from being conducted to the supporting portion while the heat from the biasing member side can be prevented from conducted to the temperature-sensing portion, thereby securing a sufficient measurement accuracy.

A temperature control device according to a still further aspect of the present invention is a temperature control device that adjusts a temperature of a measured object mounted thereon, the temperature control device including: a plate body on which the object is mounted; a temperature control means that adjusts the temperature of the object by heating or cooling the object; and a temperature sensor provided on the plate body, in which the temperature sensor includes: a temperature-sensing portion having a plane contact surface, the temperature-sensing portion measuring the temperature of the object with the contact surface contacting the object; and a supporting portion that supports the temperature-sensing portion from a side opposite to the contact surface, the supporting portion having a space at a portion that partially corresponds to the temperature-sensing portion.

According to the aspect of the present invention, since the above-described temperature sensor according to the present invention is provided to the plate body on which the objected is mounted, the temperature of the object can be measured in real time even during the temperature adjustment of the object. Accordingly, by using the measurement value of the temperature sensor, the temperature control device can be accurately controlled, whereby the temperature adjustment of the object can be performed with a high accuracy.

A temperature controller according to a still further aspect of the present invention is a temperature controller that controls a temperature of an object to be temperature-controlled, the temperature controller including: a temperature control device that adjusts the temperature of the object mounted thereon; a temperature sensor that measures the temperature by contacting the object mounted on the temperature control device; and a controller that controls a heating amount or a cooling amount applied by the temperature control device, in which the controller includes: a mounting-state judging means that judges a mounting state of the object on the temperature control device; a switching means that, based on a judging result of the mounting-state judging means, switches a control gain and a target temperature that are used for generating a control command for the temperature control device; and a control command generating means that generates the control command based on the control gain, the target temperature and a measurement value of the temperature sensor.

According to the aspect of the present invention, the control gain and the target temperature used for generating the control command is switched based on the judging result of the mounting state of the object to be temperature-controlled. With this arrangement, when the object is not mounted, the value that is set in consideration of the influence of the natural convection can be used. Accordingly, even when the measurement value of the temperature sensor is fluctuated or reduced due to an influence of the natural convection in a state where the object is not mounted, a fluctuation of the command value for the temperature control device can be prevented, and the temperature control device can be maintained at an appropriate temperature after the object is mounted. Hence, the settling time after the object is mounted can be stabilized.

A temperature controller according to a still further aspect of the present invention is a temperature controller that controls a temperature of an object to be temperature-controlled, the temperature controller including: a temperature control device that adjusts the temperature of the object mounted thereon; a first temperature sensor that measures the temperature by contacting the object mounted on the temperature control device; a second temperature sensor that measures a temperature of the temperature control device; and a controller that controls a heating amount or a cooling amount applied by the temperature control device, in which the controller includes: a mounting-state judging means that judges a mounting state of the object on the temperature control device; and a switching means that, based on a judging result of the mounting-state judging means, switches a temperature measurement value that is used for generating a control command for the temperature control device between a measurement value of the first temperature sensor and a measurement value of the second temperature sensor.

According to the aspect of the present invention, the temperature measurement value used for generating the control command is switched between the measurement value of the first temperature sensor and the measurement value of the second temperature sensor based on the judging result of the mounting state of the object to be temperature-controlled. With this arrangement, when the object is not mounted, the value that is less fluctuatable can be used as the temperature measurement value used for generating the control command. With this arrangement, the fluctuation of the control command for the temperature control device for adjusting the temperature of the object can be prevented, whereby the settling time after the object is mounted can be stabilized.

A temperature controller according to a still further aspect of the present invention is a temperature controller that controls a temperature of an object to be temperature-controlled, the temperature controller including: a first temperature sensor that measures the temperature by contacting the object mounted on the temperature control device; a second temperature sensor that measures a temperature of the temperature control device; and a controller that controls a heating amount or a cooling amount applied by the temperature control device, in which the controller includes: a mounting-state judging means that judges a mounting state of the object on the temperature control device; a switching means that, based on a judging result of the mounting-state judging means, switches a temperature measurement value that is used for generating a control command for the temperature control device between a measurement value of the first temperature sensor and a measurement value of the second temperature sensor and switches a control gain and a target temperature that are used for generating the control command, and a control command generating means that generates the control command based on the temperature measurement value, the control gain and the target temperature.

According to the aspect of the present invention, based on the judging result of the mounting state of the object, the temperature measurement value that is used for generating the control command is switched between the measurement value of the first temperature sensor and the measurement value of the second temperature sensor, and the control gain and the target temperature that are used for generating the control command are switched. Thus, when the object is not mounted, the measurement value that is less fluctuatable can be used as the temperature measurement value used for generating the control command, and the control gain for suppressing the fluctuation of the control command. With this arrangement, the fluctuation of the control command for the temperature control device for adjusting the temperature of the object can be effectively prevented, whereby the settling time after the object is mounted can be stabilized.

A method for controlling a temperature of an object to be temperature-controlled according to a still further aspect of the present invention is a method that uses: a temperature control device that adjusts the temperature of the object mounted thereon; and a temperature sensor that measures the temperature by contacting the object mounted on the temperature control device, the method including: a step to obtain a measurement value of the temperature sensor; a step to judge a mounting state of the object on the temperature control device; a step to switch a control gain and a target temperature that are used for generating a control command for the temperature control device based on a judging result of the mounting state of the object; and a step to generate the control command based on the control gain, the target temperature and the measurement value of the temperature sensor.

A method for controlling a temperature of an object to be temperature-controlled according to a still further aspect of the present invention is a method that uses: a temperature control device that adjusts the temperature of the object mounted thereon; a first temperature sensor that measures the temperature by contacting the object mounted on the temperature control device; and a second temperature sensor that measures a temperature of the temperature control device, the method including: a step to obtain measurement values of the first temperature sensor and the second temperature sensor; a step to judge a mounting state of the object on the temperature control device; a step to switch a temperature measurement value that is used for generating a control command for the temperature control device between the measurement value of the first temperature sensor and the measurement value of the second temperature sensor based on a judging result of the mounting state of the object; and a step to generate the control command based on the temperature measurement value, the control gain and the target temperature.

A method for controlling a temperature of an object to be temperature-controlled according to a still further aspect of the present invention is a method that uses: a temperature control device that adjusts the temperature of the object mounted thereon; a first temperature sensor that measures the temperature of the object mounted on the temperature control device by contacting the object; and a second temperature sensor that measures a temperature of the temperature control device, the method including: a step to obtain measurement values of the first temperature sensor and the second temperature sensor; a step to judge a mounting state of the object on the temperature control device; a step to switch a temperature measurement value that is used for generating a control command for the temperature control device between the measurement value of the first temperature sensor and the measurement value of the second temperature sensor and to switch a control gain and a target temperature that are used for generating the control command based on a judging result of the mounting state of the object; and a step to generate the control command based on the temperature measurement value, the control gain and the target temperature.

According to the aspect of the present invention, the temperature controlling methods providing the same advantages as the above-described temperature controllers according to the present invention can be obtained.

BRIEF DESCRIPTION OF THE DRAWINGS

FIG. 5 is a plan view showing a temperature-sensing portion of the temperature sensor according to the first embodiment;

FIG. 6 is a cross-sectional view of the temperature sensor taken along VI-VI line of FIG. 5 according to the first embodiment;

FIG. 8 is a control block diagram showing a controller according to the first embodiment;

FIG. 16 is a cross-sectional view showing a conventional hot plate.

DETAILED DESCRIPTION OF PREFERRED EMBODIMENT(S)

Embodiments of the present invention will be described below with reference to the drawings. Incidentally, in the description of the below-described second embodiment and thereafter, the same components as in the following first embodiment will be allotted with the same numerals, a detailed explanation for which will be omitted.

First Embodiment

[1-1] Overall Arrangement

Figure 1:
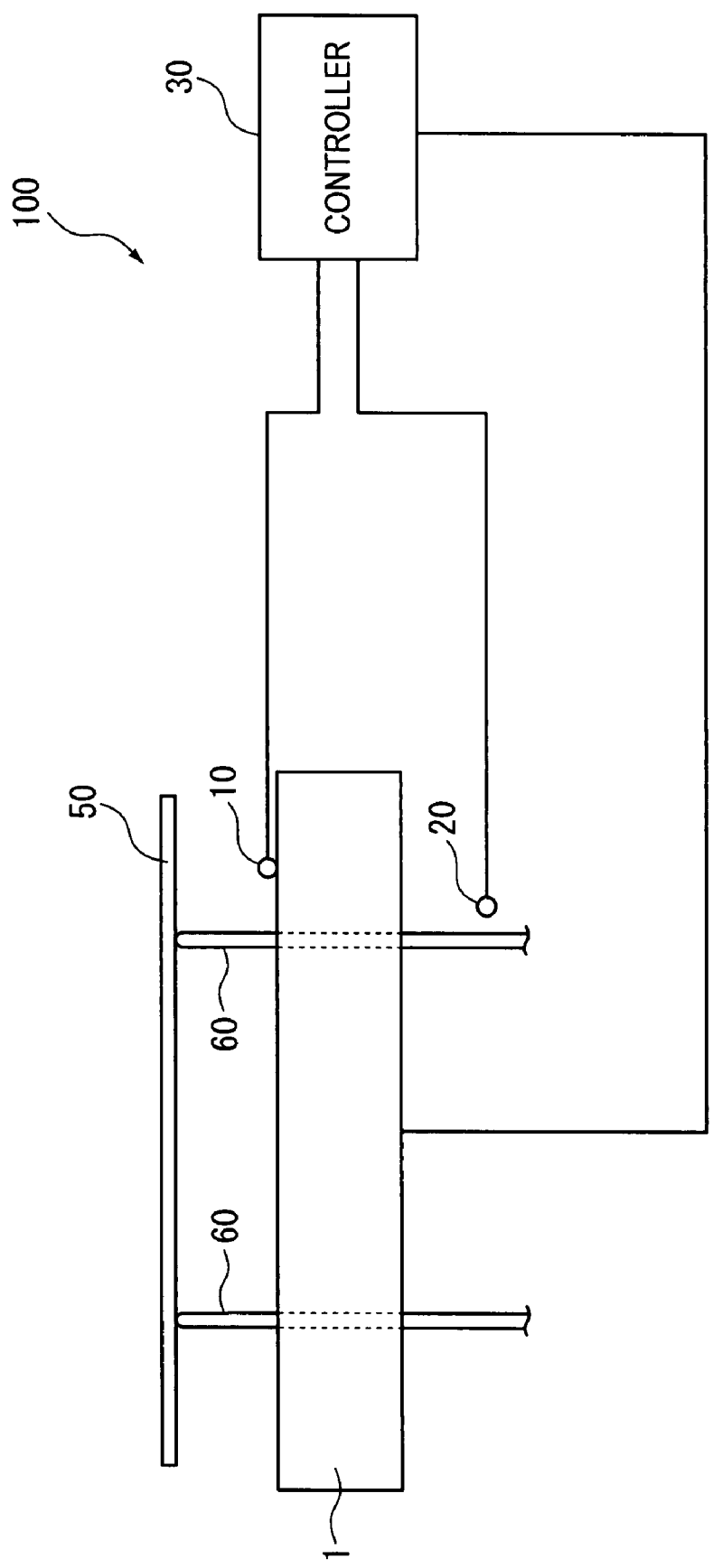
FIG. 1 is an illustration schematically showing an overall arrangement of a temperature controller according to a first embodiment of the present invention.

In FIG. 1 showing an overall arrangement of a temperature controller 100 according to a first embodiment of the present invention, the temperature controller 100 includes a hot plate 1 (temperature control device), a temperature sensor 10, a position sensor 20 and a controller 30.

The hot plate 1 is a device for adjusting a temperature of a wafer 50 (measured object, to-be-temperature-controlled object) by heating, and is adapted to control an amount of the applying heat. The wafer 50 having been transferred by a transfer robot (not shown) is once placed on a lift pin 60 that is adapted to be lifted up and down while penetrating the hot plate 1. Subsequently, by lifting down the lift pin 60, the wafer 50 is mounted on the hot plate 1.

A temperature sensor 10 is attached to a surface of the hot plate 1 to contact a back surface of the wafer 50 that has been lowered in accordance with the lifting down of the lift pin 60. The temperature sensor 10 measures a temperature of the wafer 50 by contacting the wafer 50. Incidentally, although a plurality of temperature sensors 10 are provided on the surface of the hot plate 1, FIG. 1 shows only one of the temperature sensors 10 to facilitate visualization. On the other hand, in the vicinity of the lift pin 60, a position sensor 20 is disposed to measure a stroke of the lift pin 60 in an up-and-down direction.

Based on measurement values of the temperature sensor 10 and the position sensor 20 output to the controller 30, the controller 30 generates a control command for controlling the temperature of the wafer 50. Then, the hot plate 1 adjusts the amount of heat applied to the wafer 50 in accordance with the control command from the controller 30.

[1-2] Arrangement of Hot Plate

Figure 2:
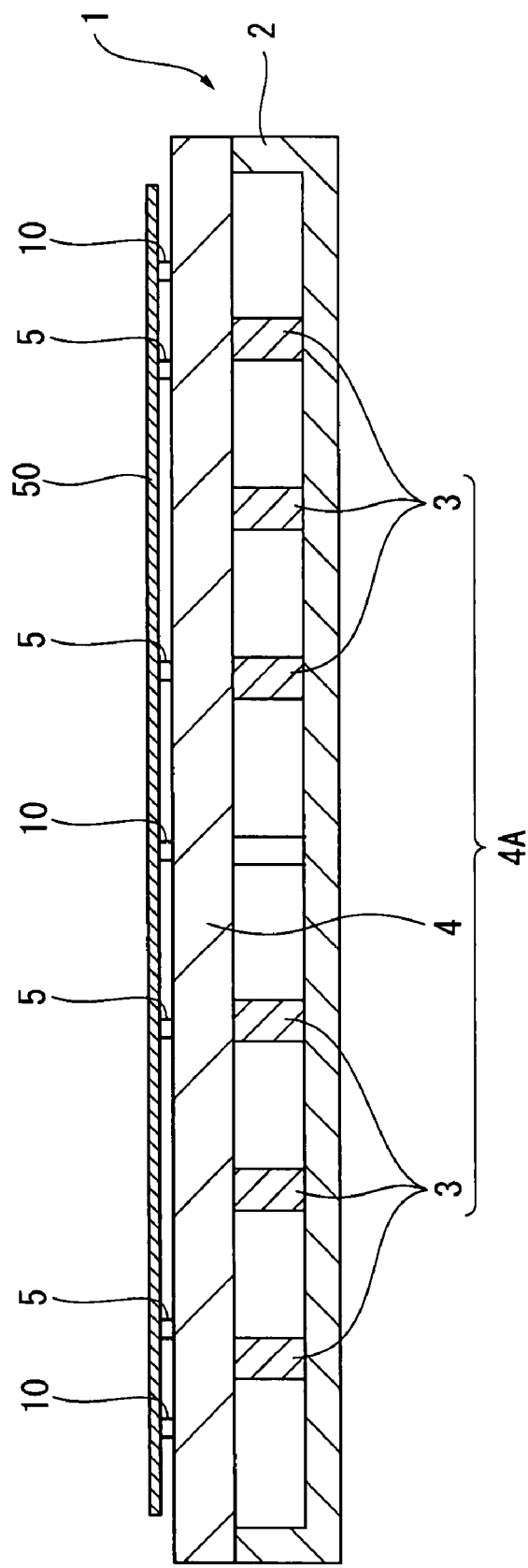
FIG. 2 is a cross-section view showing a hot plate according to the first embodiment.

In FIG. 2, the hot plate 1 includes a case 2, a heater 3, a plate body 4, a support pin 5 and the temperature sensor 10.

In a concave portion provided all over the planarly-viewed circular case 2, a plurality of belt-like heaters 3 divided to be planarly arc shaped are concentrically disposed. Covering the heaters 3, the plate body 4 is fixed to the case 2. The heaters 3 and the plate body 4 form a heating portion 4A of the hot plate 1. The wafer 50 is applied with heat from the heater 3 via the plate body 4.

Figure 3:
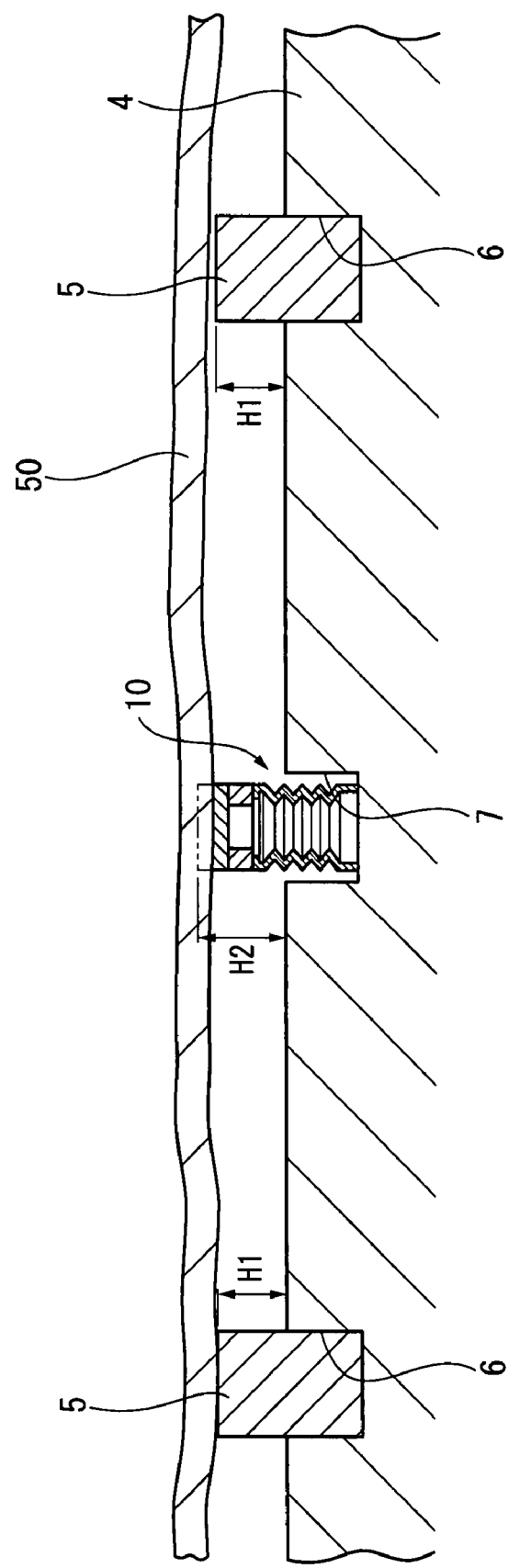
FIG. 3 is an enlarged cross-section showing a state in which a wafer is mounted on the hot plate according to the first embodiment.

As shown in FIG. 3, in the surface of the plate body 4 (i.e., the surface of the plate body 4 on which the wafer 50 is mounted), a plurality of support-pin mounting holes 6 for mounting the support pin 5 and a plurality of sensor mounting holes 7 for mounting the temperature sensor 10 are formed at positions as desired.

In FIG. 3, a height dimension H1 of the support pin 5 from the surface of the plate body 4 when the support pin 5 is mounted in the support-pin mounting hole 6 is approximately 0.1 mm. The wafer 50 is mounted on the support pin 5. In other words, the support pin 5 supports the wafer 50 while maintaining a gap of approximately 0.1 mm from the plate body 4, whereby the back surface of the wafer 50 is prevented from being contaminated and a uniformity of a temperature distribution in the wafer 50 can be improved. The height dimension H1 is generally set within a range of 0.05 to 0.15 mm.

The temperature sensor 10, whose detailed arrangement will be described later, is mounted in the sensor mounting hole 7. A height dimension H2 of the temperature sensor 10 from the surface of the plate body 4 when the wafer is not mounted thereon is set to be approximately 0.15 mm. In other words, the height dimension H2 of the temperature sensor 10 from the surface of the plate body 4 is set to be larger than the height dimension H1 of the support pin 5 from the surface of the plate body 4. With this arrangement, when the wafer 50 is mounted on the hot plate 1, the temperature sensor 10 can reliably contact the back surface of the wafer 50 to measure the temperature of the wafer 50. When a diameter of the sensor mounting hole 7 is large, the uniformity of the in-plane temperature distribution in the wafer 50, particularly in a state of a transition, may be influenced. Accordingly, it is favorable to reduce the diameter of the sensor mounting hole 7 as much as possible, and the diameter is exemplarily set to be about 1 mm in the present embodiment.

The hot plate 1 as arranged above can control the temperature of the wafer 50 mounted on the hot plate 1 by independently controlling values of electric currents flowing in the heaters 3. In addition, the measurement using the temperature sensor 10 that contacts the back surface of the wafer 50 can enable the temperature of the wafer 10 during processing to be measured in real time in situ. Accordingly, by controlling the current flowing in the heater 3 using the measurement value of the temperature sensor 10, the temperature of the wafer 50 during processing can be maintained at a target temperature with a high accuracy.

[1-3] Arrangement of Temperature Sensor

Figure 4:
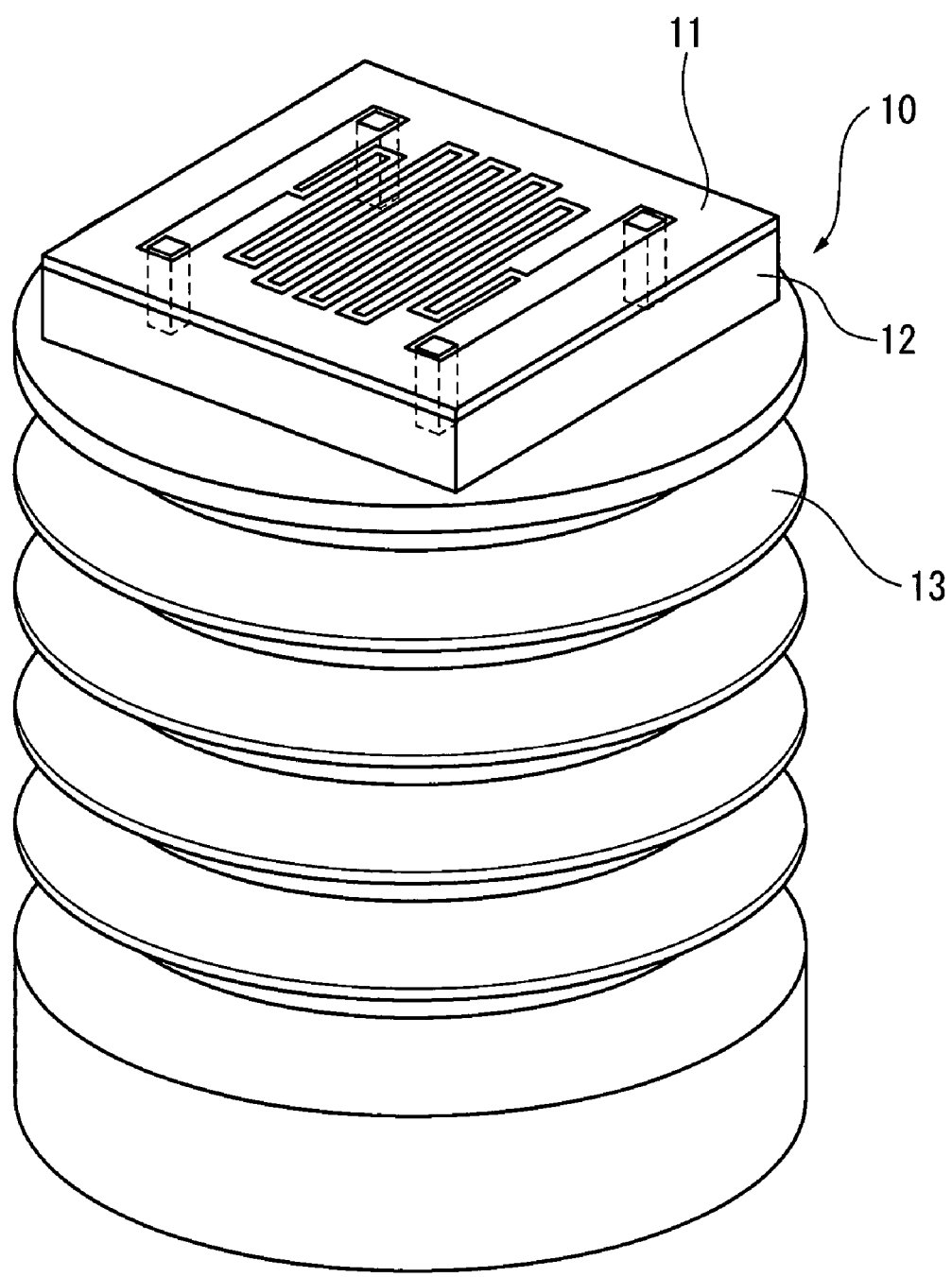
FIG. 4 is a perspective view showing a temperature sensor according to the first embodiment.

As shown in FIG. 4, the temperature sensor 10 includes a temperature-sensing portion 11 for measuring the temperature, a supporting portion 12 for supporting the temperature-sensing portion 11 and a bellows 13 for biasing the temperature-sensing portion 11 via the supporting portion 12 (biasing member). In short, the temperature sensor 10 has a three-layer structure formed by the temperature-sensing portion 11, the supporting portion 12 and the bellows 13.

As shown in FIGS. 5 and 6, the temperature-sensing portion 11, which is a planar platinum resistance temperature detector whose surface area is 1 mm$^2$ or less, includes a laminar surface portion 111 and a pattern forming portion 112.

The surface portion 111, which is formed by die-cutting a silicon substrate, includes a polished wafer contact surface 111A (contact surface) for contacting the wafer 50. The measurement accuracy of the temperature sensor 10 depends on a contact thermal resistance between the surface portion 111 of the temperature-sensing portion 11 and the back surface of the wafer 50. Since the wafer 50 itself is lightweight and surface hardness of the wafer 50 and the surface portion 111 is high, the contact thermal resistance depends on a surface roughness of the surface portion 111 and does not depend on a contact pressure with the wafer 50. Accordingly, since the measurement accuracy of the temperature sensor 10 depends on the surface roughness of the wafer contact surface 111A, the surface of the wafer contact surface 111A needs to be sufficiently polished. On the other hand, there is no need to control the contact pressure with the wafer 50. All that is required is that the surface portion 111 contacts the wafer 50.

The pattern forming portion 112 includes an electrical insulating film 112A and a platinum pattern 112B formed within the electrical insulating film 112A. In FIG. 5, which is a plan view showing the temperature-sensing portion 11, the platinum pattern 112B is indicated in solid line to facilitate visualization. The electrical insulating film 112A, which is formed of tantalum pentoxide ($Ta_2O_5$), can also serve as an adhesive. At four corners of a surface opposite to the surface 111 of the pattern forming portion 112, holes 112C are formed. A wire 14 (conductor) coated with an insulating film is bonded to a platinum portion having been exposed by the hole 112C.

In the temperature-sensing portion as arranged above, silicon forming the surface portion 111 has a high heat conductivity of 168 W/mK, such that the heat of the wafer 50 is easily conducted to the inside of the surface portion 111, whereby the heat of the wafer 50 can be efficiently conducted to the pattern forming portion 112. Since the wire 14 bonded to the temperature-sensing portion 11, which has a considerably small diameter, conducts much less heat than the temperature-sensing portion 11 does, the heat from the wire 14 does not influence the measurement accuracy of the temperature sensor 10, and thus the heat is ignorable.

The supporting portion 12, which is provided between the temperature-sensing portion 11 and the bellows 13 to support the temperature-sensing portion 11, includes a reinforcing portion 121 and a heat insulating portion 122.

The reinforcing portion 121, which is a thin film for reinforcing the temperature-sensing portion 11, is formed from silica dioxide ($SiO_2$) having a small heat conductivity. In four corners of the reinforcing portion 121, through holes 121A are formed at positions corresponding to the holes 112C provided in the pattern forming portion 112 of the temperature-sensing portion 11. The through holes 121A penetrate from the pattern forming portion 112 to the heat insulating portion 122.

The heat insulating portion 122, which forms a heat insulating layer, is formed from a resin having a small heat conductivity and shaped in a square pipe. In four corners of the heat insulating portion 122, thick portions 122A whose thickness is increased toward the inside are formed. On the other hand, through holes 122B are formed at positions corresponding to the through holes 121A of the reinforcing portion 121. The through holes 121B penetrate from the reinforcing portion 121 to the bellows 13. The heat insulating portion 122 and the reinforcing portion 121 defines a space S at a portion partially corresponding to the temperature-sensing portion 11. An air layer formed by the air in the space S is provided to a lower side of the temperature-sensing portion 11.

The supporting portion 12 as arranged above is mainly formed from a resin having a small heat conductivity as described above. The supporting portion 12 contributes to reducing the heat conductivity of the supporting portion 12 together with the air inside the space S defined by the reinforcing portion 121 and the heat insulating portion 122. Consequently, the heat conductivity of the supporting portion 12 including the air in the space S become close to that of the air, thereby forming a heat insulating layer. With this arrangement, a heat insulation is advantageously performed between the temperature-sensing portion 11 and the bellows 13.

In the temperature-sensing portion 11 and the supporting portion 12, the holes 112C of the temperature-sensing portion 11 and the through holes 121A, 122B of the supporting portion 12 are linearly aligned to provide a wire insertion holes 15. The wire 14 bonded to the platinum pattern 112B of the pattern forming portion 112 in the temperature-sensing portion 11 is drawn to the bellows 13 side passing through the wire insertion hole 15. As described above, by forming the holes 112C and the through holes 121A, 122B (i.e., the components of the wire insertion hole 15) on the four corners of the temperature-sensing portion 11 and the supporting portion 12, a concentration of the wires 14 on the temperature-sensing portion 11 and a resultant heat concentration can be prevented.

In the bellows 13, which is a metallic micro bellows, the supporting portion 12 is mounted to a first end in a direction of expansion and contraction while a second end is fixed to a bottom end of the sensor mounting hole 7. Specifically, in an upper portion 131, which is provided to the first end of the bellows 13, a through hole 132 is formed to communicate the inside and the outside of the bellows 13. The supporting portion 12 is mounted to the upper portion 131 to cover the through hole 132. The wire 14 having been drawn to the bellows 13 side through the wire insertion hole 15 from the temperature-sensing portion 11 passes through the through hole 132 and the inside of the bellows 13 to reach the outside.

A spring constant of the bellows 13 is set such that a height of the wafer contact surface 111A from the hot plate 1 surface becomes to be within a range of 0.05 to 0.15 mm due to the weight of the wafer 50 when the wafer 50 is mounted on the hot plate 1.

As described above, since the measurement accuracy of the temperature sensor 10 depends only on the surface roughness of the wafer contact surface 111A of the temperature-sensing portion 11, the measurement temperature is not influenced by the pressure as long as the temperature-sensing portion 11 contacts the wafer 50. Accordingly, there is no need to control a pressurizing force applied to the wafer contact surface 111A of the temperature-sensing portion 11. Thus, a pressurizing force control mechanism for this purpose does not need to be provided.

Next, a method for manufacturing the temperature sensor 10, particularly a method for manufacturing the temperature-sensing portion 11 and the supporting portion 12, will be described.

Since the size of the temperature sensor 10 is as small as micro-order as described above, the temperature sensor 10 is manufactured by a technique of Micro Electro Mechanical Systems (MEMS).

Figure 7A:
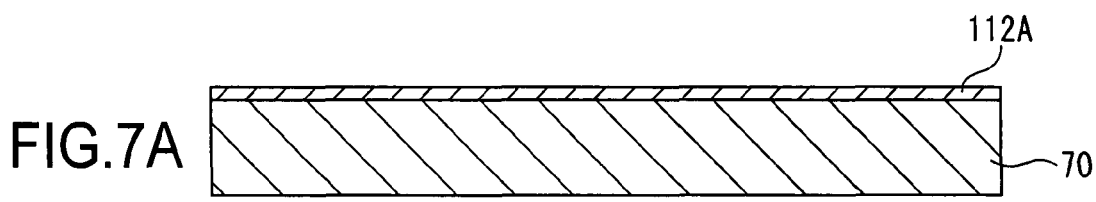
FIGS. 7A to 7F are illustrations showing a method for manufacturing the temperature sensor according to the first embodiment.

Initially, as shown in FIG. 7A, after the surface of the silicon substrate 70 is polished to be 200 µm thick, the electrical insulating film 112A of 500 nm thickness formed of tantalum pentoxide is provided on the polished surface of the silicon substrate 70.

Figure 7B:
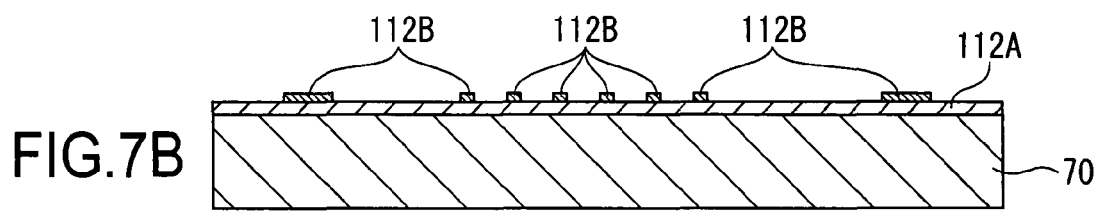
Figure 7C:
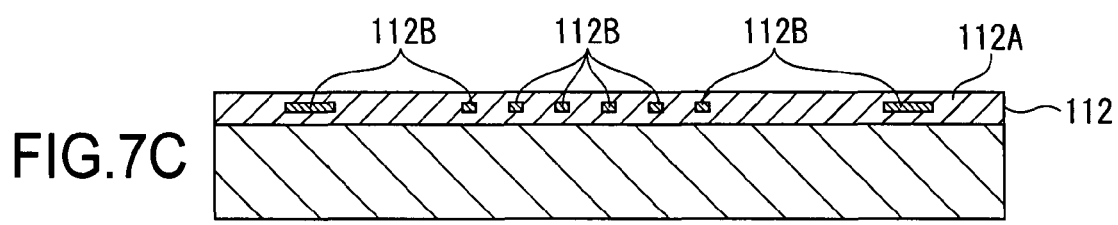

Next, as shown in FIG. 7B, the platinum pattern 112B of 450 nm thickness is formed on the electrical insulating film 112A by sputtering and etching, on which the electrical insulating film 112A of 150 nm thickness formed of tantalum pentoxide is provided as shown in FIG. 7C. At this time, the pattern forming portion 112 is formed by the electrical insulating film 112A and the platinum pattern 112B. Throughout the processes so far, a portion equivalent to the temperature-sensing portion 11 is formed.

Figure 7D:
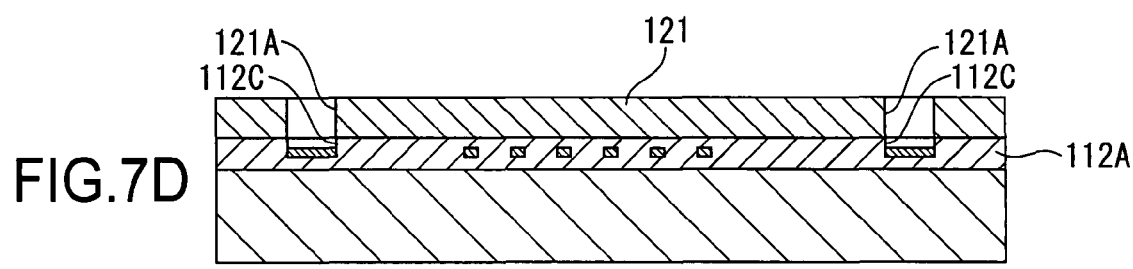

Then, as shown in FIG. 7D, a silicon dioxide film of 10 µm thickness is formed on the electrical insulating film 112A to form the reinforcing portion 121, and the hole 112C and the through hole 121A are formed in the four corners of the pattern forming portion 112 and the reinforcing portion 121 by dry etching.

Figure 7E:
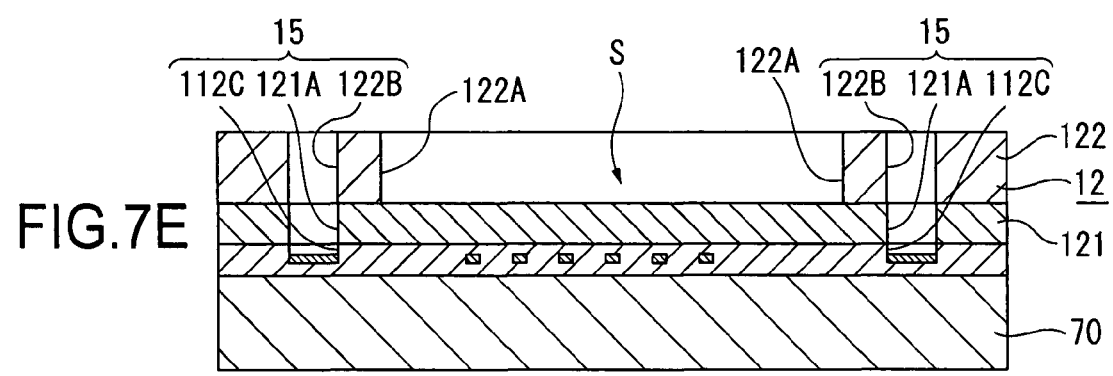

Next, as shown in FIG. 7E, after a thick film of several tens µm to several hundreds µm thickness is formed on the reinforcing portion 121 using a resist agent of a resin, a square pipe portion of the heat insulating portion 122 including the thick portion 122A and the through hole 122B communicating with the through hole 121A of the reinforcing portion 121 are formed by etching. The heat insulating portion 122 formed in this manner as well as the reinforcing portion 121 having been already formed provide the supporting portion 12 having the space S. The hole 112C of the pattern forming portion 112, the through hole 121A of the reinforcing portion 121 and the through hole 122B of the heat insulating portion 122 provide the wire insertion hole 15. At this time, the silicon substrate 70 is cut in half by dicing.

Figure 7F:
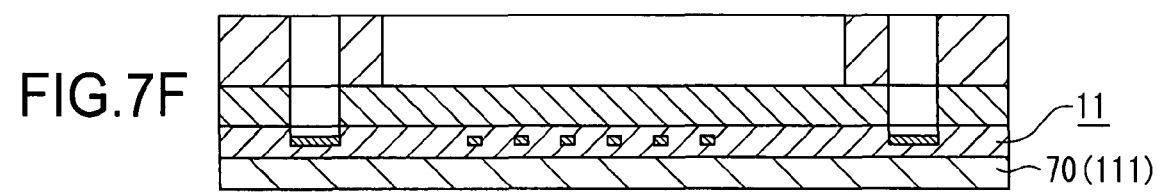

Subsequently, as shown in FIG. 7F, the surface of the silicon substrate 70 is polished to be 10 µm or less thick. With this operation of polishing, the dicing of the silicon substrate 70 is completed. With the dicing being completed, the silicon substrate 70 serves as the surface portion 111, whereby a step for forming the temperature-sensing portion 11 is completed. Then, as shown in FIG. 6, the wire 14 is inserted into the wire insertion hole 15 to be bonded to the platinum pattern 112B. Finally, the supporting portion 12 together with the temperature-sensing portion 11 is attached to the bellows 13, whereby the manufacturing of the temperature sensor 10 is completed.

In the temperature sensor 10 configured as described above, since the temperature-sensing portion 11 is formed as a platinum resistance thermometer bulb, the temperature can be measured using a relationship between the temperature and an electric resistance, which is measured by applying a constant current or using a bridge circuit, and the temperature.

[1-4] Control Structure of Controller

Next, referring to FIG. 8, the control structure of the temperature controlling by the controller 30 will be described.

In FIG. 8, the controller 30 is arranged as a controlling means for controlling the temperature of the wafer 50. To an input side of the controller 30, the temperature sensor 10 and the position sensor 20 are electrically connected.

On the other hand, to an output side of the controller 30, the heater 3 provided inside the hot plate 1 is electrically connected. By independently controlling values of the currents flowing in the heaters 3, the controller 30 controls an amount of heat applied by the heaters 3, thereby controlling the temperature of the wafer 50.

The controller 30 includes a mounting-state judging means 31, a target-temperature storage means 32, a control-gain storage means 33, a switching means 34 and a control-command generating means 35.

The mounting-state judging means 31 judges a mounting state of the wafer 50 on the hot plate 1 based on the measurement value of the position sensor 20. Specifically, when a position of an upper end of the lift pin 60, which is obtained from the measurement value of the position sensor 20, is located below a position of an upper end of the support pin 5, the mounting-state judging means 31 judges that the wafer 50 is mounted. Otherwise, the mounting-state judging means 31 judges that the wafer 50 is not mounted.

The target-temperature storage means 32 stores a plurality of values as target temperatures T for generating a control command. Specifically, the target-temperature storage means 32 stores: a first target temperature T1 used for dealing with a natural convection; and a second target temperature T2 used in a state where the wafer 50 is mounted.

The first target temperature T1, which is set so as to avoid an influence of the natural convection, is used in a state where the wafer 50 is not mounted. A value of the first target temperature T1 is set to be lower than a value of the second target temperature T2 that is used in a state where the wafer 50 is mounted, so that a decrease of the measurement temperature of the temperature sensor 10 due to the natural convection can be compensated. In a case where the compensation is not made, the target temperature T, which has been set at the second target temperature T2 in the state where the wafer 50 is not mounted, remains to be the second target temperature T2, and the measurement temperature of the temperature sensor 10 is decreased due to the influence of the natural convection. Accordingly, the hot plate 1 is controlled to increase the amount of the heat applied by the heater 3. In this case, a temperature of the plate body 4 becomes much higher than the target temperature T, such that the temperature of the wafer 50 is overshot after the wafer 50 is mounted. On the other hand, the second target temperature T2, which is a target temperature for the wafer 50 during processing, is used in the state where the wafer 50 is mounted.

The control-gain storage means 33 stores a plurality of values as control gains G used for generating a control command. Specifically, the control-gain storage means 33 stores: a first control gain G1 used for dealing with a natural convection; and a second control gain G2 and a third control gain G3 used in the state where the wafer 50 is mounted.

The first control gain G1, which is set so as to avoid an influence of the natural convection, is used in the state where the wafer 50 is not mounted. A value of the first control gain 1 is set to be lower than values of the second and third control gains G2, G3 that are used in the state where the wafer 50 is being processing, so that the first control gain 1 is hardly influenced by a fluctuation of the measurement temperature of the temperature sensor 10 due to the natural convection. The second and third control gains G2, G3, which are used in the state where the wafer 50 is mounted, are set such that the second control gain G2 is larger than the third control gain G3.

The switching means 34 initially selects one of the control gain G1 and the other control gains from the values stored in the control-gain storage means 33 based on a judging result of the mounting state of the wafer 50 by the mounting-state judging means 31, and selects either one of the first and second target temperatures T1, T2 from the values stored in the target-temperature storage means 32. In this manner, the switching means 34 switches the control gain and the target temperature to the selected control gain and the target temperature, which are used as the control gain G and the target temperature T used for generating a control command. In addition, when the wafer 50 is judged to be mounted, the switching means 34 selects either one of the control gains G2, G3 from the values stored in the control-gain storage means 33 in accordance with a value of a temperature deviation e between the measurement value of the temperature sensor 10 and the target temperature T used for generating a control command, and switches the control gain to the selected control gain, which is used as the control gain G used for generating the control command.

The control-command generating means 35 generates a control command for the heater 3 and outputs the control command to the hot plate 1. Specifically, the control-command generating means 35 performs a proportional integral differential (PID) control, using a temperature deviation e between the measurement value of the temperature sensor 10 and the target temperature T that is used for generating the command value. At this time, the value that the switching means 34 has selected for switching based on the judgment result of the mounting-state judging means 31 is used as the control gain G used for generating the control command. In other words, the control-command generating means 35 performs a gain-scheduled control, by which the control gain G and the target temperature T used for generating the command value are switched depending on circumstances.

[1-5] Operations of Controller

Figure 9:
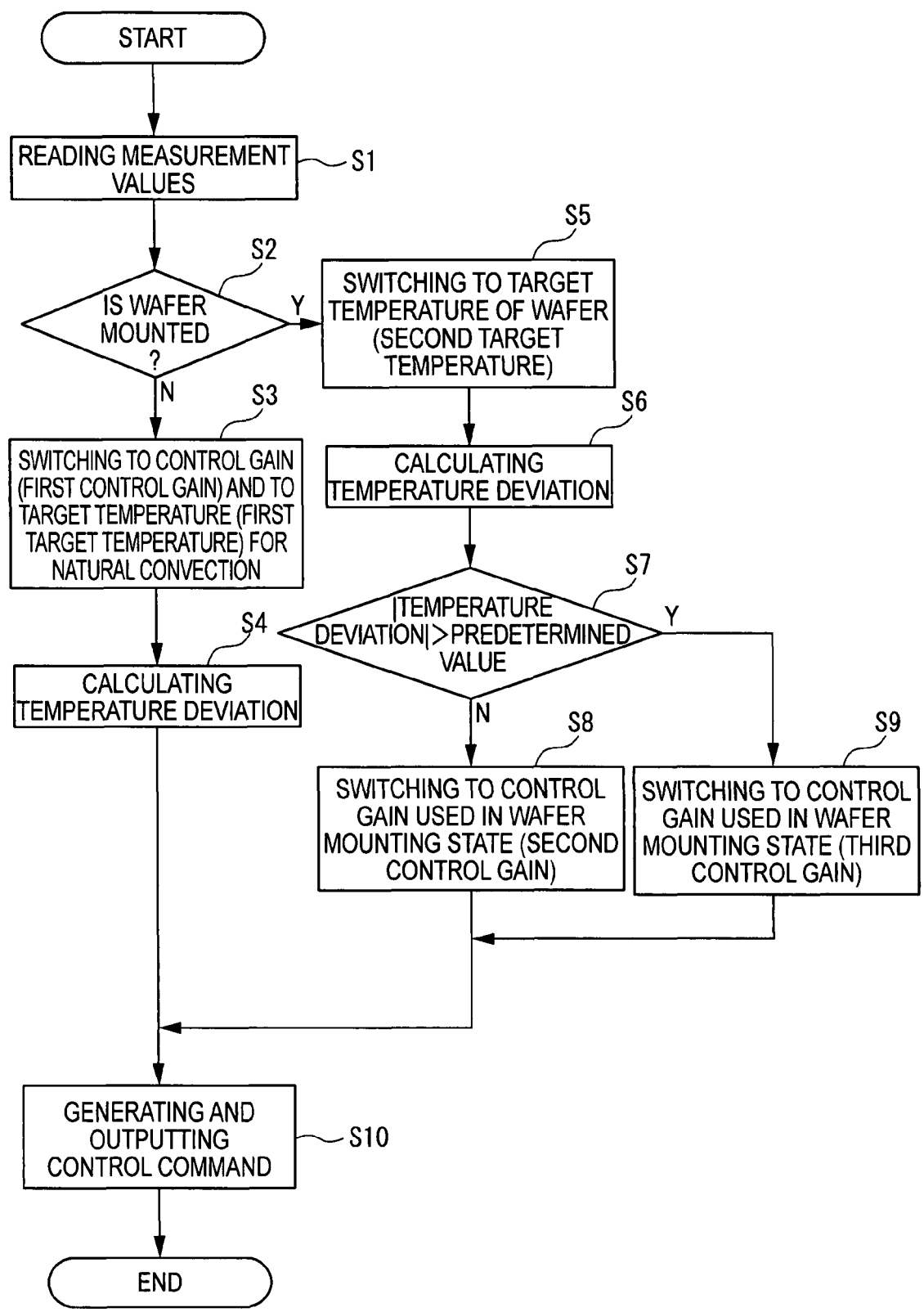
FIG. 9 is a flow chart showing a control flow according to the first embodiment.

Next, operations of the controller 30 will be described based on the flow chart shown in FIG. 9.

Initially, the controller 30 reads the measurement values of the temperature sensor 10 and the position sensor 20 (step S1).

Then, the mounting-state judging means 31 judges whether or not the wafer 50 is mounted on the hot plate 1 based on the measurement value of the position sensor 20 (step S2).

When the wafer 50 is judged not to be mounted on the hot plate 1, the switching means 34 selects the first control gain G1 and the first target temperature T1 used for dealing with the natural convection, and switches the control gain and the target temperature to the selected control gain and the target temperature, which are used as the control gain G and the target temperature T used for generating the control command (step S3). Then, the control-command generating means 34 calculates the temperature deviation e between the measurement value of the temperature sensor 10 and the target temperature T that is used for generating the command value (step S4).

On the other hand, when the wafer 50 is judged to be mounted on the hot plate 1, the switching means 34 selects the second target temperature T2 that is the target temperature of the wafer 50, and switches the target temperature to the selected target temperature, which is used as the target temperature T used for generating the control command (step S5). Subsequently, the switching means 34 calculates the temperature deviation e between the measurement value of the temperature sensor 10 and the target temperature T that is used for generating the control command (step S6), and judges whether or not the absolute value of the temperature deviation e is larger than a predetermined value (i.e., whether or not the absolute value of a value that is obtained by subtracting the measurement value of the temperature sensor 10 from the target temperature T is larger than a predetermined value or not) (step S7). Then, the switching means 34 switches the control gain G to the second control gain G2, which is used as the control gain G used for generating the control command when the absolute value of the temperature deviation e is smaller than the predetermined value (step S8), and switches the control gain G to the third control gain G3 when the absolute value of the temperature deviation e is larger than the predetermined value (step S9).

Subsequently, the control-command generating means 35 generates the control command for the hot plate 1 by performing the PID control using the control gain G that the switching means 34 has selected for switching and the value of the temperature deviation e, and outputs the control command to the hot plate 1 (step S110).

Second Embodiment

Next, a second embodiment according to the present invention will be described referring to FIG. 10.

In the above-described first embodiment, the supporting portion 12 of the temperature sensor 10 is directly attached to the upper portion 131 of the bellows 13.

In contrast, the second embodiment is different in that the supporting portion 12 is attached to the upper portion 131 of the bellows 13 via an adapter 16.

Figure 10:
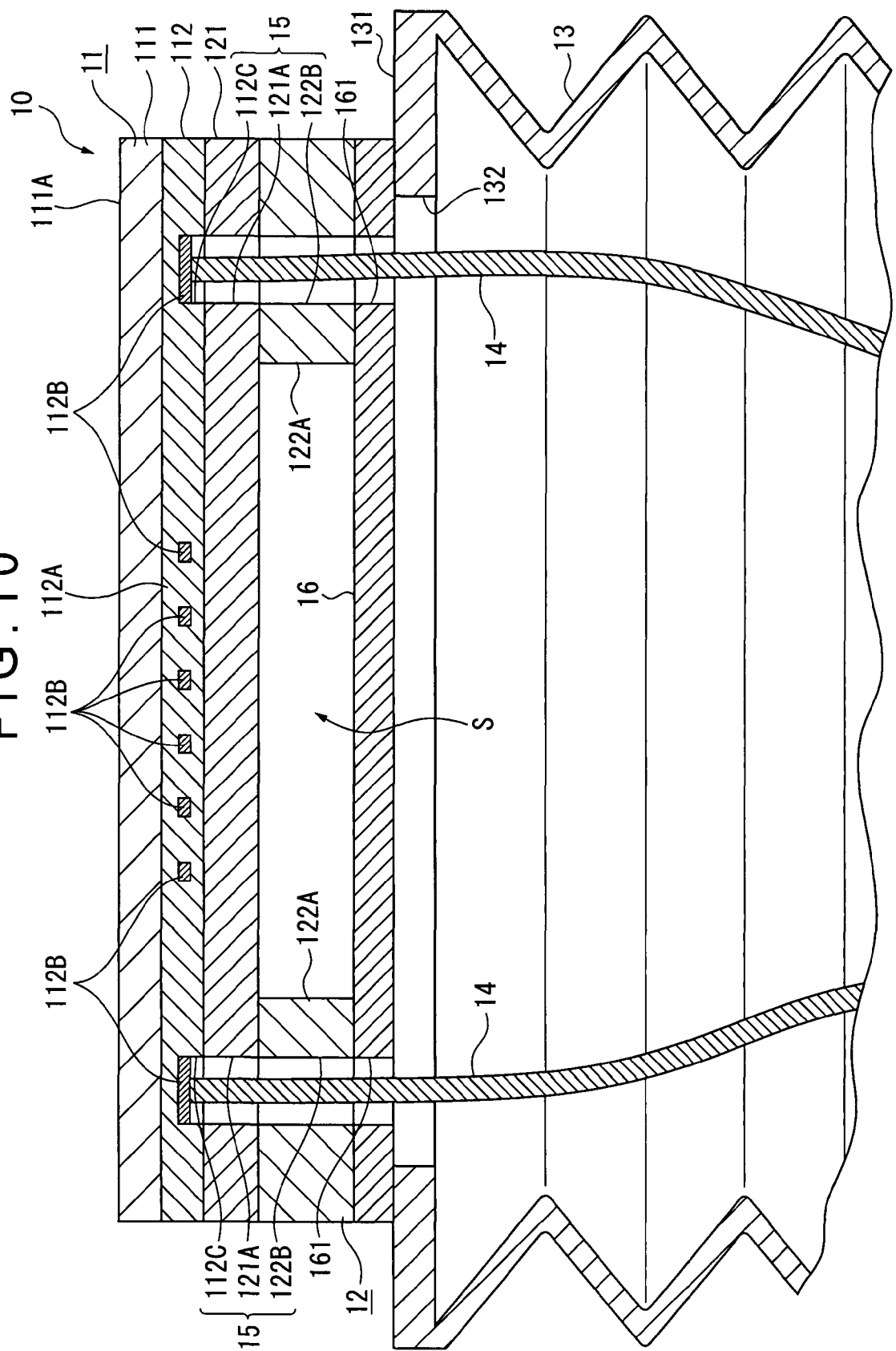
FIG. 10 is a cross-sectional view showing a temperature sensor according to a second embodiment of the present invention.

Specifically, as shown in FIG. 10, the temperature sensor 10 according to the present embodiment includes the temperature-sensing portion 11, the supporting portion 12, bellows 13 and the adapter 16. A biasing member according to the present embodiment includes the bellows 13 and the adapter 16, and an end portion of the biasing member includes the upper portion 131 of the bellows 13 and the adapter 16.

The adapter 16, which is made of ceramics, is attached to the upper portion 131 of the bellows 13. In the vicinity of the center of the adapter 16, an air hole (not shown) is formed. In the adapter 16, a hole 161 is formed at a position corresponding to the through hole 122B of the supporting portion 12. In other words, the hole 112C of the temperature-sensing portion 11, the through holes 121A, 122B of the supporting portion 12 and the hole 161 of the adapter 16 are substantially linearly aligned. The wire 14 having been drawn from the temperature-sensing portion 11 to the bellows 13 side through the through holes 121A, 122B passes through the hole 161 and the inside of the bellows 13 to reach the outside.

In the temperature sensor 10 arranged as described above, the supporting portion 12 and the adapter 16 define the space S at the portion partially corresponding to the temperature-sensing portion 11.

When the air inside the space S is expanded in accordance with a temperature change, the air is discharged from the inside of the space S through the air hole formed in the adapter 16. On the other hand, when the air is contracted, the air is supplied into the space S through the air hole.

Third Embodiment

Next, a third embodiment according to the present invention will be described referring to FIG. 11.

In the above-described first and second embodiments, the holes 112C of the temperature-sensing portion 11, the through holes 121A, 122B of the supporting portion 12 and the hole 161 of the adapter 16 are linearly aligned in the temperature sensor 10. On the other hand, the wire 14 bonded to the platinum pattern 112B of the temperature-sensing portion 11 is drawn to the bellows 13 side through the though holes 121A, 122B and the hole 161.

In contrast, the third embodiment is different in that a through-via 17 is provided from the platinum pattern 112B of the temperature-sensing portion 11 to the bellows 13, and that the through-via 17 is extended toward the center of the bellows 13 by an adapter electrode 162.

Figure 11:
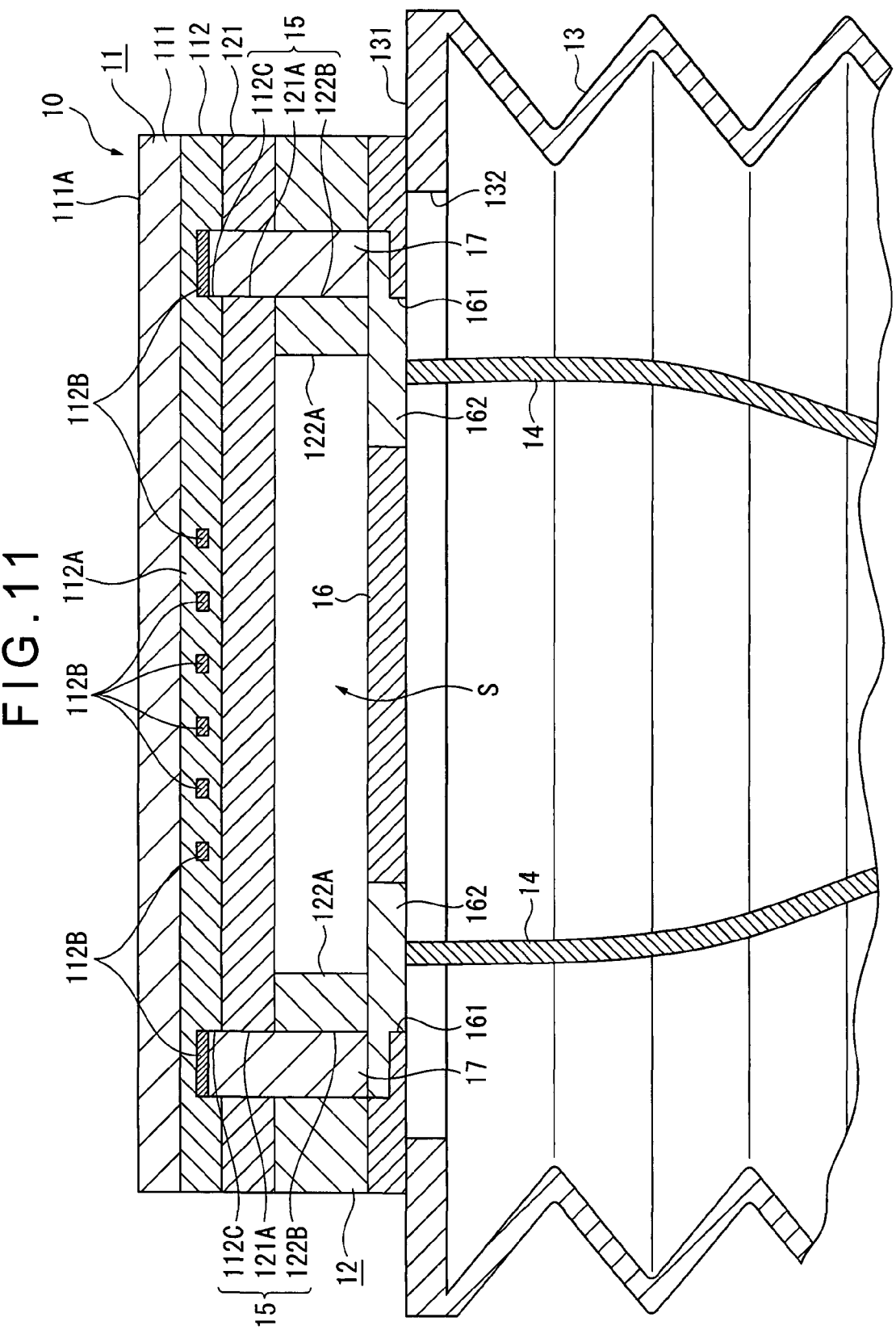
FIG. 11 is a cross-sectional view showing a temperature sensor according to a third embodiment of the present invention.

Specifically, in the temperature sensor 10 according to the present embodiment, as shown in FIG. 11, the through-via 17 extends from the platinum pattern 112B of the temperature-sensing portion 11 toward the adapter 16, passing through the through holes 121A, 122B of the supporting portion 12. The hole 161, which is formed in the adapter 16, houses the adapter electrode 162 therein. The through-via 17 is extended along an in-plane direction of the adapter 16 by the adapter electrode 162 to be exposed to the bellows 13 side at a portion close to the center of the adapter 16. The wire 14, which is bonded to a portion of the adapter electrode 162 exposed to the bellows 13, passes through the inside of the bellows 13 to reach the outside. A conductor according to the present embodiment includes the through-via 17, the adapter electrode 162 and the wire 14.

Also in the temperature sensor 10 arranged as described above, the space S is defined by the supporting portion 12 and the adapter 16 as in the second embodiment, whereby a heat insulating is favorably performed between the temperature-sensing portion 11 and the bellows 13.

In the temperature sensor 10, since the through-vias 17 are extended from the four corners of the supporting portion 12 to the positions close to the center of the adapter 16 by the adapter electrode 162 to be exposed to the bellows 13 side, the wire 14 connected to the exposed portion of the adapter electrode 162 can be prevented from interfering with the inner wall of the bellows 13.

Fourth Embodiment

Next, a fourth embodiment according to the present invention will be described referring to FIGS. 12 to 14.

In the above-described first embodiment, the switching means 34 switches the control gain G and the target temperature T used for generating the control command based on the judgment result of the mounting-state judging means 31.

In contrast, the fourth embodiment is different in that a second temperature sensor 40 is provided in the hot plate 1, and that a switching-and-judging means switches a temperature measurement value used for generating the control command between the measurement value of the first temperature sensor 10 provided to the surface of the plate body 4 and a measurement value of the second temperature sensor 40 provided inside the hot plate 1. The first temperature sensor 10 is the same as the temperature sensor that is attached to the plate body 4 in the first embodiment.

Figure 12:
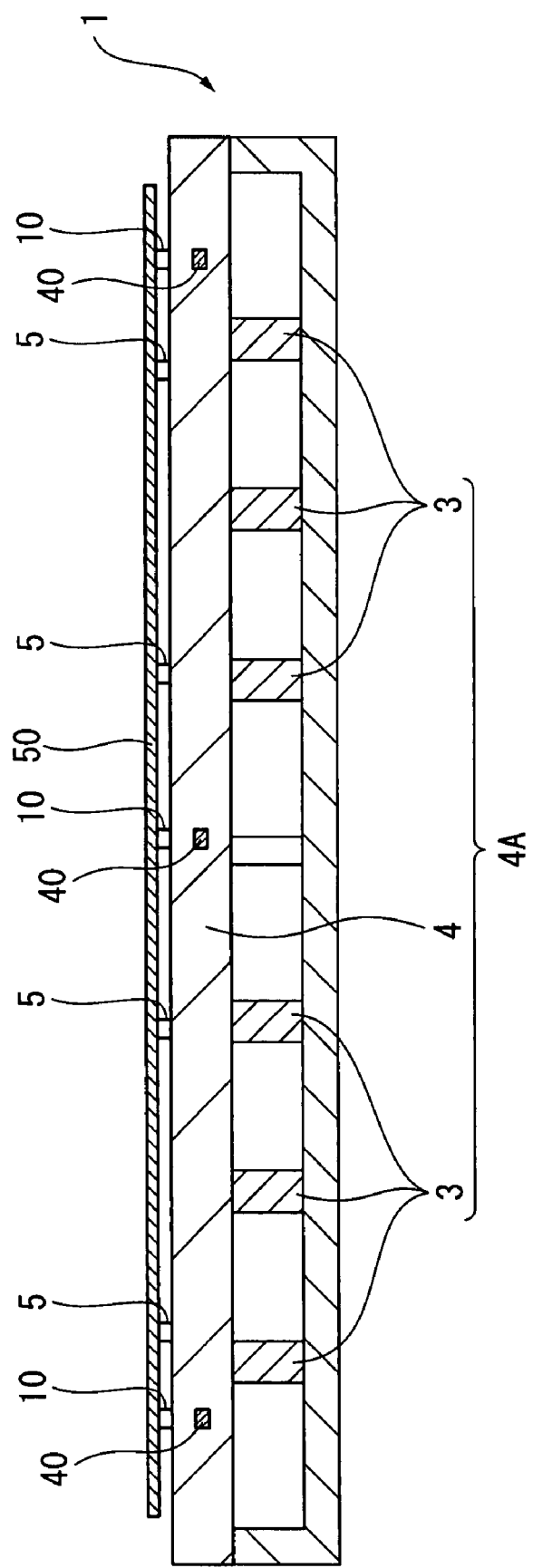
FIG. 12 is a cross-section view showing a hot plate according to a fourth embodiment of the present invention.

As shown in FIG. 12, the second temperature sensor 40 is embedded inside the plate body 4 of the hot plate 1. Accordingly, the second temperature sensor 40 does not directly contact a gas inside a chamber, such that the second temperature sensor 40 is not influenced by the natural convection arising on the plate even in the state where the wafer 50 is not mounted. Thus, the second temperature sensor 40 outputs a stable measurement signal although the signal does not correspond to the temperature of the wafer 50 but to the temperature of the plate body 4.

Figure 13:
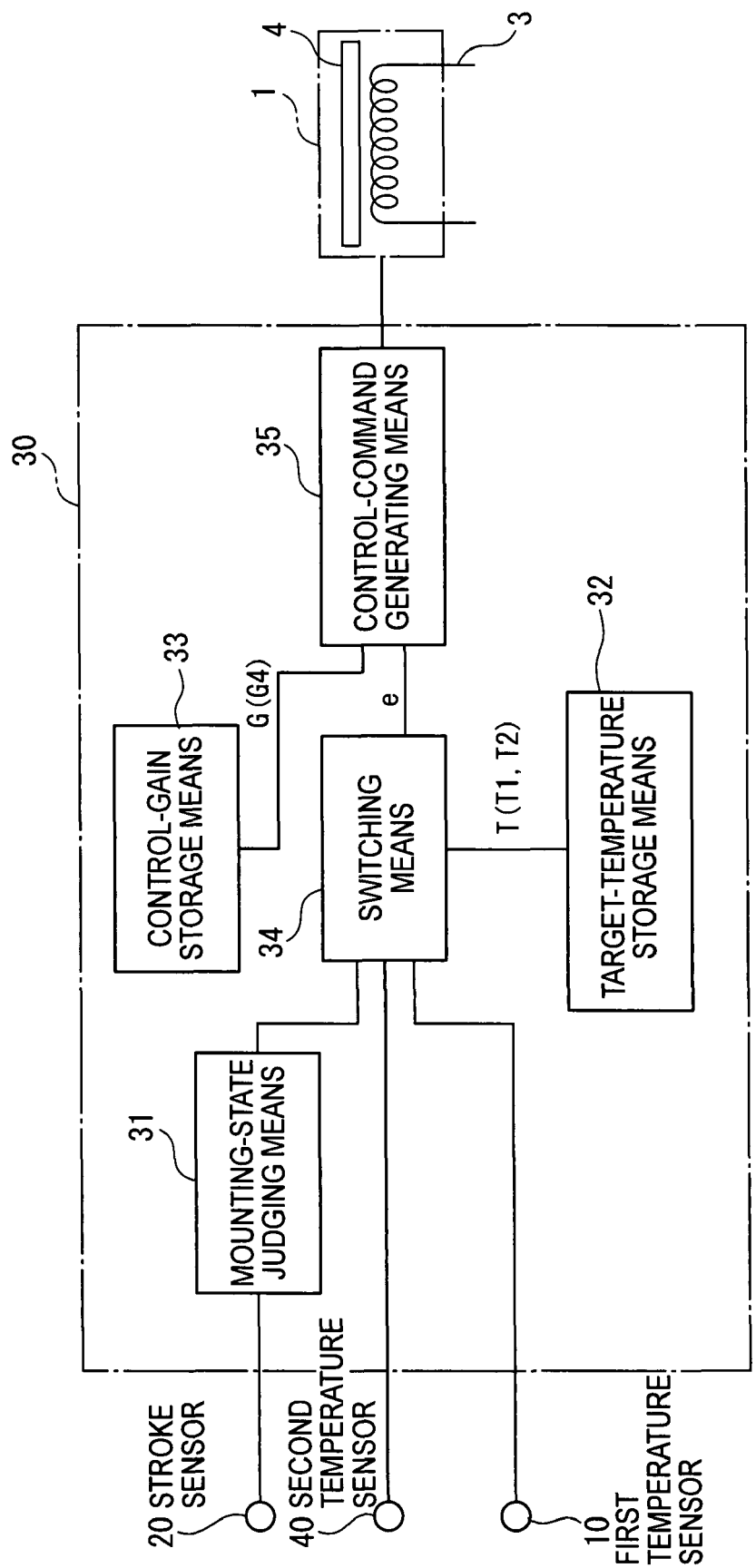
FIG. 13 is a control block diagram showing a controller according to the fourth embodiment.
Figure 14:
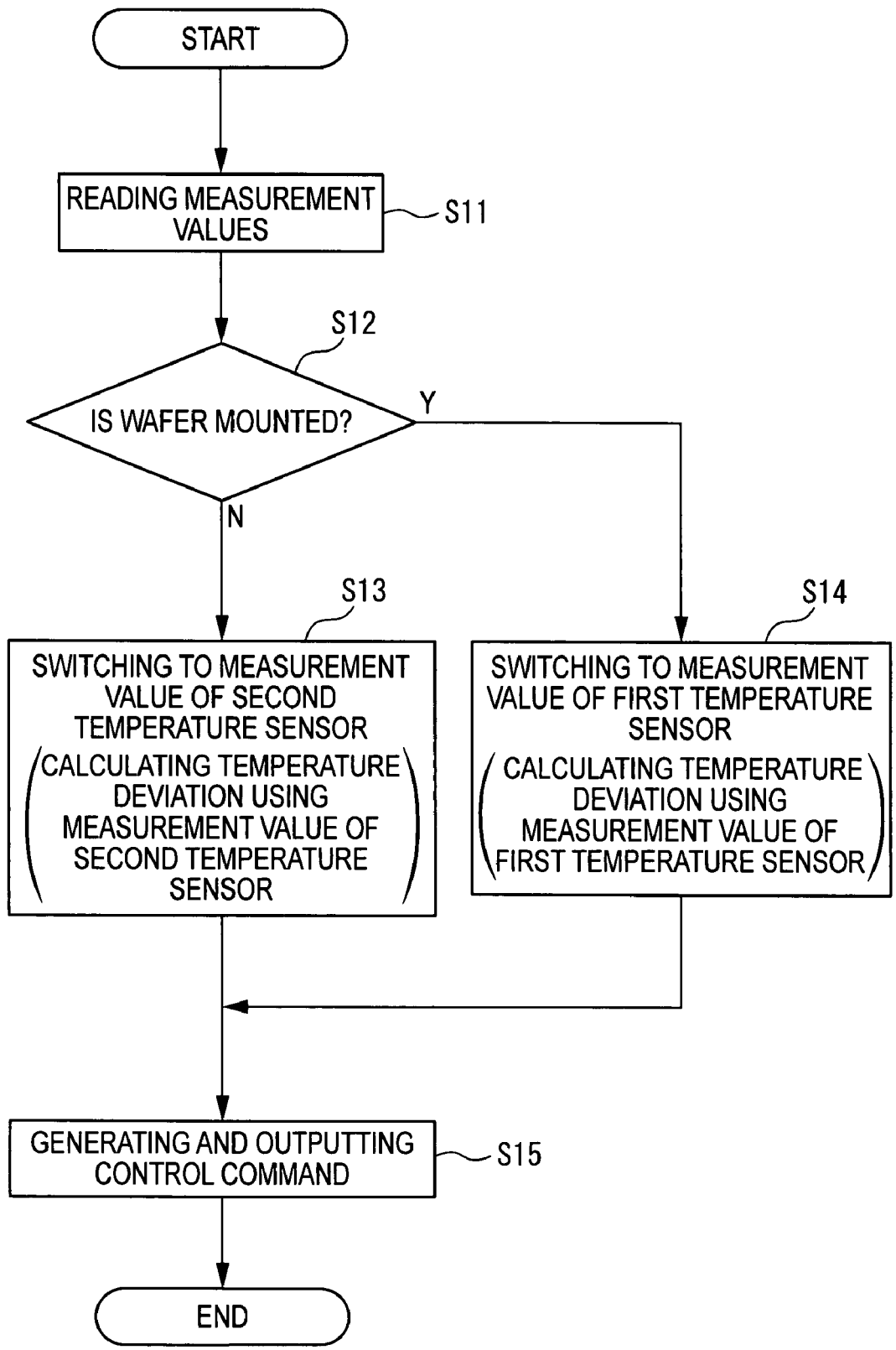
FIG. 14 is a flow chart showing a control flow according to the fourth embodiment.

As shown in FIG. 13, in the control structure of the controller 30, some of the means adapt a different structure of the output and input signals as compared with the control structure of the first embodiment. The different structure is adapted mainly because functions of the switching means 34 are different, and because the second temperature sensor 40 is provided inside the hot plate 1 in addition to the first temperature sensor 1 provided to the surface of the plate body 4. Accordingly, the second temperature sensor 40 is electrically connected to the input side of the controller 30. In order to simplify the control, in the present embodiment, only a control gain G4 is stored in the control-gain storage means 33 while the control-command generating means 35 obtains the control gain G4 as the control gain G used for generating the control command directly from the control-gain storage means 33.

In the control structure of the controller 30 as described above, the switching means 34 selects either one of the temperature sensors 10, 40 based on the judging result of the mounting-state judging means 31, and switches the measurement value to a measurement value of the selected temperature sensor, which is used as the temperature measurement value used for generating the control command. In short, the switching means 34 calculates the value of the temperature deviation e, using the measurement value of the temperature sensor selected from either of the temperature sensors 10, 40.

Next, operations of the controller 30 according to the present embodiment will be described based on the flow chart shown in FIG. 14.

Initially, after the controller 30 reads the measurement values of the first temperature sensor 10, the position sensor 20 and the second temperature sensor 40 (step S11), the mounting-state judging means 31 judges whether or not the wafer 50 is mounted on the hot plate 1 based on the measurement value of the position sensor 20 (step S12).

When the mounting-state judging means 31 judges that the wafer 50 is not mounted on the hot plate 1, the switching means 34 switches the temperature measurement value used for generating the control command to the measurement value of the second temperature sensor 40. In other words, the switching means 34 calculates the value of the temperature deviation e, using the measurement value of the second temperature sensor 40 (step S13).

On the other hand, when the mounting-state judging means 31 judges that the wafer 50 is mounted on the hot plate 1, the switching means 34 switches the temperature measurement value used for generating the control command to the measurement value of the first temperature sensor 10, and calculates the value of the temperature deviation e based on the measurement value (step S14).

Subsequently, the control-command generating means 35 obtains the control gain G4 stored in the control-gain storage means 33 as the control gain G used for generating the control command, and generates the control command for the hot plate 1 by performing the PID control using the value of the temperature deviation e to output the control command to the hot plate 1 (step S15).

Fifth Embodiment

Figure 15:
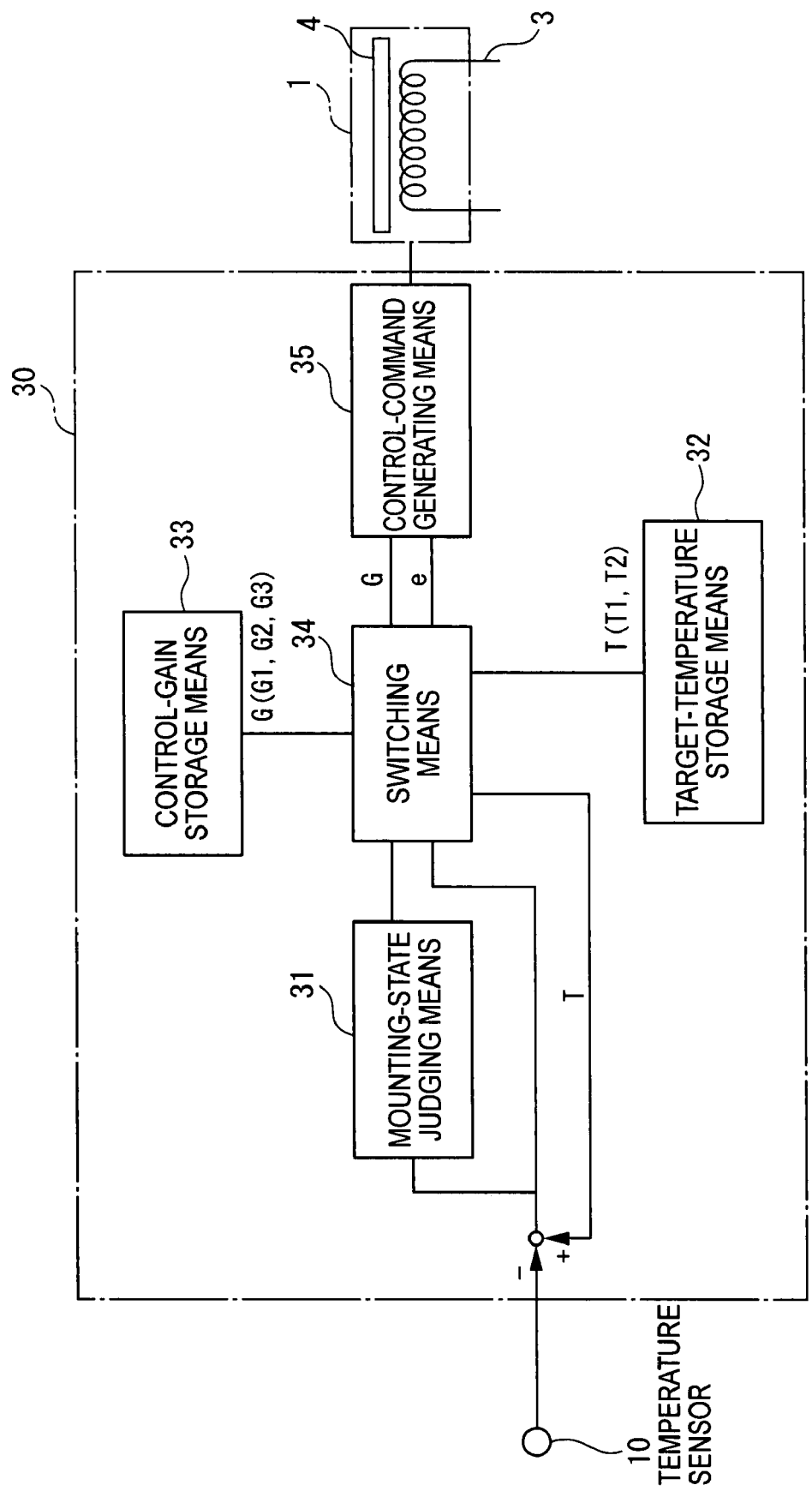
FIG. 15 is a control block diagram showing a controller according to a fifth embodiment of the present invention.

Next, a fifth embodiment according to the present invention will be described referring to FIG. 15.

In the above-described first embodiment, the position sensor 20 for measuring the stroke amount of the lift pin 60 is provided while the mounting-state judging means 31 judges the mounting state of the wafer 50 based on the measurement value of the position sensor 20. In other words, the mounting state of the wafer 50 is judged based on the measurement value of the stoke sensor 20, and based on the judging result, the control gain G used for generating the control command is switched.

In contrast, as shown in FIG. 13, the fifth embodiment is different in that the mounting-state judging means 31 judges the mounting state of the wafer 50 based on a value of a deviation between the measurement value of the temperature sensor 10 and a previous target temperature T. In short, the mounting state of the wafer 50 is judged based on the value of the deviation, and based on the judging result, the control gain G and the target temperature T used for generating the control command are switched. Accordingly, the position sensor 20 is neither provided nor electrically connected to the input side of the controller 30.

Specifically, the mounting-state judging means 31 judges the mounting state of the wafer 50 by monitoring a change in the value of the deviation between the measurement value of the temperature sensor 10 and the previous target temperature T, which is prominently observed when the wafer 50 is mounted. In other words, the mounting-state judging means 31 monitors a decrease in the measurement value of the temperature sensor 10 caused by a contact with the wafer 50 of a low temperature before heating.

Although the operations of the controller 30 in the above-described control structure is different from that of the first embodiment in that the mounting state of the wafer 50 is judged not based on the measurement value of the position sensor 20 but based on the value of the deviation between the measurement value of the temperature sensor 10 and the previous target value T, the other operations are the same as in the first embodiment, a description of which is omitted herein.

Modifications of Embodiments

Note that the present invention is not limited to the embodiments as described above but may include various modifications, improvement and the like thereof as long as an object of the present invention can be achieved.

Although the supporting portion 12, the bellows 13 or the adapter 16 are formed as separate components in the above embodiments, the components are not limited thereto but may be, for example, integrally formed of one material such as a resin foam.

Although the supporting portion 12 is formed mainly of a polyimide resin or an epoxy resin in the above embodiments, the material of the supporting portion 12 is not limited thereto but the supporting portion 12 may be formed of other materials such as Peek material or Teflon (Registered Trademark) as long as the material has a heat conductivity that is equal to or less than that of the resins.

In addition, the supporting portion 12 does not have to be formed of a resin but may be formed of glass. In this case, by shaping the heat insulating portion 122 of the supporting portion 12, for example, to be a plurality of columns in which portions neighboring the through hole 122B are maintained, the heat conductivity of the supporting portion 12 can be reduced to be equal to that of the supporting portion 12 made of a resin.

Although the reinforcing portion 121 and the heat insulating portion 122 of the supporting portion 12 are formed of different materials in the above embodiments, the components are not limited thereto but may be formed of one material. When the surface portion 111 and the pattern forming portion 112 have a high strength, the reinforcing portion 121 may not be provided. In short, as long as a supporting portion has the space S and is formed of a material having a low heat conductivity, such a supporting portion is included in a scope of the present invention.

Although the supporting portion 12 is attached to the upper portion 131 of the bellows 13 via the adapter 16 and the space S is defined by the supporting portion 12 and the adapter 16 in the second and third embodiments, the arrangements are not limited thereto. The supporting portion 12 may be shaped, for example, such that the end of the bellows 13 in the expansion and contraction direction is closed by an upper portion without providing the through hole 132, and the space S may be defined by such an upper portion and the supporting portion 12.

Although the temperature sensor 10 is attached to the hot plate 1 separately from the support pin 5 in the above-described embodiments, the arrangements are not limited thereto. For example, the temperature sensor 10 may be provided inside the support pin 5, or the temperature 10 may serve also as the support pin 5 without providing the support pin 5.

Although the mounting state of the wafer 50 is judged based on the measurement value of the position sensor 20 in the first and fourth embodiments and based on the value of the deviation between the measurement value of the temperature sensor 10 and the previous target temperature T in the fifth embodiment, the present invention is not limited thereto. In short, as long as the mounting state of the wafer 50 is judged, for example, instead of the position sensor 20, a switch may be provided below the lift pin 60. In this case, by detecting a contact of the lower end of the lift pin 60 with the switch, the mounting state of the wafer 50 may be judged.

Although the control gain G4 is singularly stored in the control-gain storage means 33 and the control-command generating means 35 obtains the control gain G4 from the control-gain storage means 33 as the control gain G used for generating the control command in the fourth embodiment, the arrangement is not limited thereto. As in the first embodiment, the control gains G2, G3 may be stored in the control-gain storage means 33 and the switching means 34 may select either of the values to switch the control gain thereto as the control gain G used for generating the control command. In this case, there is no particular need to set the first control gain G1 used for dealing with the natural convection. For instance, the control gain G3 may be used.

Although the heaters 3 and the plate body 4 form the heating portion 4A of the hot plate 1 in the above-described embodiments, the arrangement of the heating portion 4A is not limited thereto. The heating portion 4A may be formed solely by the heater 3 without the plate body 4, so that the wafer 50 is heated directly by the heater 3.

Although the temperature sensor 10 is attached to the hot plate 1 in the above-described embodiments, the arrangement is not limited thereto. For example the temperature sensor 10 may be used with other temperature adjusting plates such as a cooling plate used in photolithography or a susceptor used in the etching step.

Specific configurations and profiles of the present invention may be other configurations or the like as long as an object of the present invention can be achieved.

The priority application Numbers JP2006-187246, JP2006-187247, and JP2007-172964 upon which this patent application is based is hereby incorporated by reference.

What is claimed is:

1. A temperature sensor that measures a temperature of an object, comprising:
   a temperature-sensing portion having a plane contact surface, the temperature-sensing portion measuring the temperature of the object when the contact surface contacts the object;
   a supporting portion which supports a whole of a surface of the temperature-sensing portion opposite to the contact surface of the temperature-sensing portion, wherein the supporting portion has a space at a portion that corresponds to the temperature-sensing portion and forms a heat insulating layer including the space; and
   a biasing member which is provided on a side of the supporting portion opposite to the temperature-sensing portion, and which biases the temperature-sensing portion toward the object; and
   wherein the biasing member comprises a bellows.

2. The temperature sensor according to claim 1, wherein the supporting portion is made of a resin or glass.

3. The temperature sensor according to claim 1, wherein the biasing member biases the temperature-sensing portion toward the object by elastic force.

4. The temperature sensor according to claim 1, wherein the supporting portion is provided between the temperature-sensing portion and the biasing member.

5. The temperature sensor according to claim 1, further comprising:
   a conductor connected to the temperature-sensing portion, wherein the conductor is connected to the temperature-sensing portion on a side opposite to the contact surface.

6. The temperature sensor according to claim 1, wherein the heat insulating layer insulates between the temperature-sensing portion and the biasing member.

7. The temperature sensor according to claim 1, wherein the temperature-sensing portion includes a pattern forming portion having a platinum pattern formed within an electrical insulating film, the pattern forming portion having a surface on a side of the supporting portion, and
   wherein the supporting portion supports a whole of the surface of the pattern forming portion.

8. The temperature sensor according to claim 1, wherein the supporting portion includes a reinforcing portion and a heat insulating portion, the reinforcing portion abutting a whole of the surface of the temperature-sensing portion opposite to the contact surface of the temperature-sensing portion to reinforce the temperature-sensing portion, the heat insulating portion having a pipe shape and being provided on the reinforcing portion on a side opposite to the temperature-sensing portion, and
   wherein the reinforcing portion and the heat insulating portion form the space at the portion that corresponds to the temperature-sensing portion.

9. A temperature sensor that measures a temperature of an object, comprising:
   a temperature-sensing portion having a plane contact surface, the temperature-sensing portion measuring the temperature of the object when the contact surface contacts the object;
   a supporting portion that supports the temperature-sensing portion from a side opposite to the contact surface, the supporting portion having a through hole opening to the temperature-sensing portion;
   a biasing member having an end portion provided at an end in a biasing direction and a hole provided in the end portion, the biasing member biasing the temperature-sensing portion toward the object;

an adapter provided between the biasing member and the supporting portion, the adapter having a hole communicating with the through hole of the supporting portion; and a conductor connected to the temperature-sensing portion, the conductor extending from the temperature-sensing portion to an outside, wherein the supporting portion and the adapter define a space at a portion that partially corresponds to the temperature-sensing portion, wherein the supporting portion forms a heat insulating layer including the space; and wherein the conductor extends from the temperature-sensing portion to the outside through the through hole of the supporting portion, the hole of the adapter, the hole of the biasing member and an inside of the biasing member.

10. The temperature sensor according to claim 9, wherein the hole of the adapter is formed at a position corresponding to a position of the through hole in the supporting portion.

11. The temperature sensor according to claim 9,
wherein the temperature-sensing portion has a resistance temperature detector,
wherein the supporting portion covers the resistance temperature detector, and
wherein the supporting portion and the adapter define the space at a portion that corresponds to the resistance temperature detector.

12. The temperature sensor according to claim 9,
wherein the hole of the adapter extends therein along an in-plane direction of the adapter toward a center of the adapter, and
wherein the conductor is exposed to the biasing member side at a portion of the center of the adapter.

13. A temperature control device that adjusts a temperature of an object mounted thereon, comprising:
a plate body for mounting the object, wherein the object is mounted on the plate body via a support pin with a gap between a surface of the plate body and the object;
a temperature control unit that adjusts the temperature of the object by heating or cooling the plate body; and
a temperature sensor that is provided on the surface of the plate body and is located between the surface of the plate body and the object,
wherein the temperature sensor includes:
a temperature-sensing portion having a plane contact surface, the temperature-sensing portion measuring the temperature of the object when the contact surface contacts the object;
a supporting portion that supports the temperature-sensing portion from a side opposite to the contact surface, the supporting portion being arranged to be in contact with the temperature-sensing portion so as to cover the temperature-sensing portion, the supporting portion being arranged to always have a space at a portion that corresponds to the temperature-sensing portion and forming a heat insulating layer including the space; and
a biasing member which is provided on a side of the supporting portion opposite to the temperature-sensing portion, and which biases the temperature-sensing portion toward the object.

14. A temperature sensor that measures a temperature of an object, comprising:
a temperature-sensing portion having a plane contact surface, the temperature-sensing portion measuring the temperature of the object when the contact surface contacts the object;
a supporting portion which supports the temperature-sensing portion from a side opposite to the contact surface, the supporting portion having a through hole opening to the temperature-sensing portion;
a biasing member having an end portion provided at an end in a biasing direction and a hole provided in the end portion, the biasing member biasing the temperature-sensing portion toward the object; and
a conductor connected to the temperature-sensing portion, the conductor extending from the temperature-sensing portion to an outside;
wherein the supporting portion has a space at a portion that partially corresponds to the temperature-sensing portion;
wherein the supporting portion forms a heat insulating layer including the space; and
wherein the conductor extends from the temperature-sensing portion to the outside through the through hole of the supporting portion, the hole of the biasing member and an inside of the biasing member; and
wherein the biasing member comprises a bellows.

15. The temperature sensor according to claim 14,
wherein the temperature-sensing portion has a resistance temperature detector,
wherein the supporting portion covers the resistance temperature detector, and
wherein the supporting portion has the space at a portion that corresponds to the resistance temperature detector.

* * * * *